(12) United States Patent
Sakamoto

(10) Patent No.: US 8,456,747 B2
(45) Date of Patent: Jun. 4, 2013

(54) ZOOM LENS AND IMAGE PICKUP APPARATUS INCLUDING THE SAME

(75) Inventor: Masaru Sakamoto, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 127 days.

(21) Appl. No.: 12/887,779

(22) Filed: Sep. 22, 2010

(65) Prior Publication Data

US 2011/0080651 A1    Apr. 7, 2011

(30) Foreign Application Priority Data

Oct. 5, 2009 (JP) ................. 2009-231316

(51) Int. Cl.
*G02B 15/14* (2006.01)
(52) U.S. Cl.
USPC ............ 359/676; 359/683; 359/685
(58) Field of Classification Search
USPC .......................... 359/676, 683, 695
See application file for complete search history.

(56) References Cited

U.S. PATENT DOCUMENTS

| 4,874,231 | A | 10/1989 | Aono |
|---|---|---|---|
| 5,808,809 | A | 9/1998 | Yahagi |
| 6,788,464 | B2 * | 9/2004 | Misaka ................ 359/676 |
| 2002/0131184 | A1 | 9/2002 | Yasui |

FOREIGN PATENT DOCUMENTS

JP    10-161026 A    6/1998

OTHER PUBLICATIONS

Feb. 21, 2011 European Search Report in European Patent Appln. No. 10186368.6.

* cited by examiner

*Primary Examiner* — Alicia M Harrington
(74) *Attorney, Agent, or Firm* — Fitzpatrick, Cella, Harper & Scinto

(57) ABSTRACT

A zoom lens includes, in order from an object side, a positive first lens unit without moving for zooming, a negative second lens unit for magnification, a positive third lens unit for magnification, a negative fourth lens unit compensating for image plane variation due to magnification, and a positive fifth lens unit without moving for zooming. When assuming a focal length of the entire system at a wide angle end as fW, and a zoom ratio as Z, a focal length fM at an intermediate zoom position is expressed by the equation: $fM = fW \times \sqrt{Z}$. When assuming an interval between the second and third lens units at the wide angle end as L2W, and a maximum value of the interval between the second and third lens units in a zoom range from the wide angle end to the focal length fM as L2max, the following conditional expression is satisfied:

$$1.1 < L2max/L2W < 55.0.$$

6 Claims, 16 Drawing Sheets

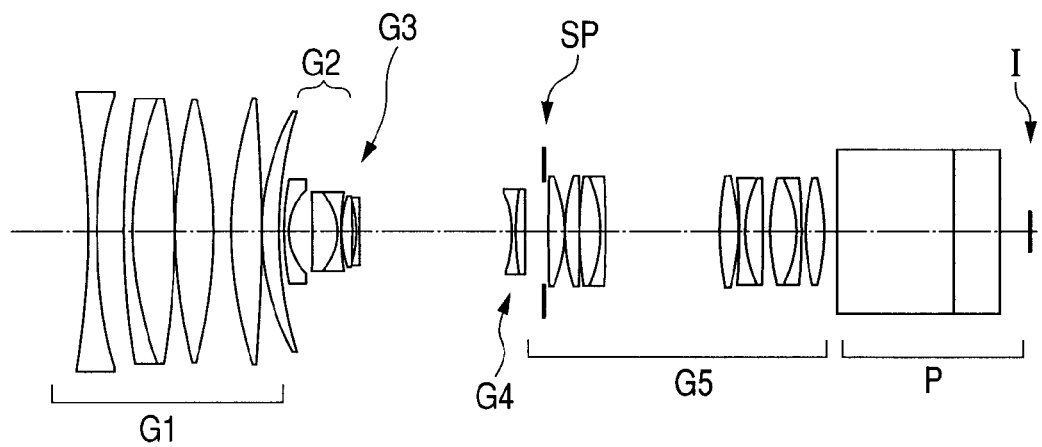
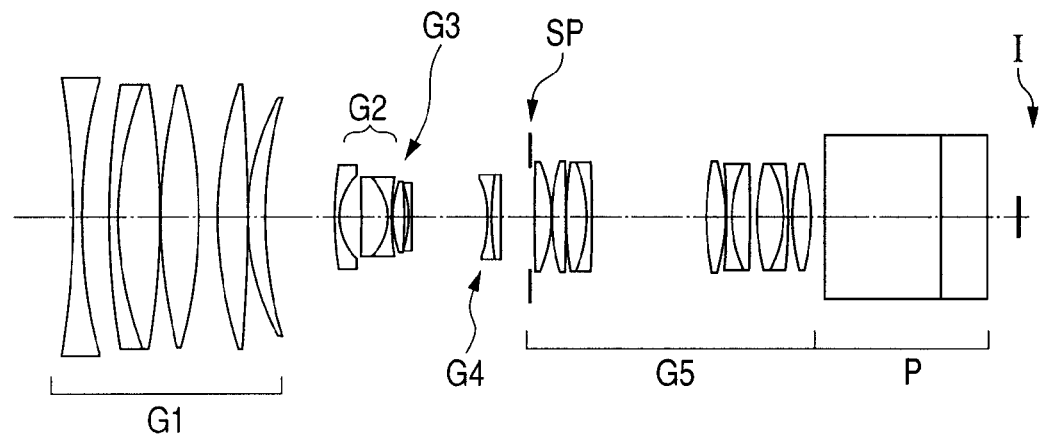
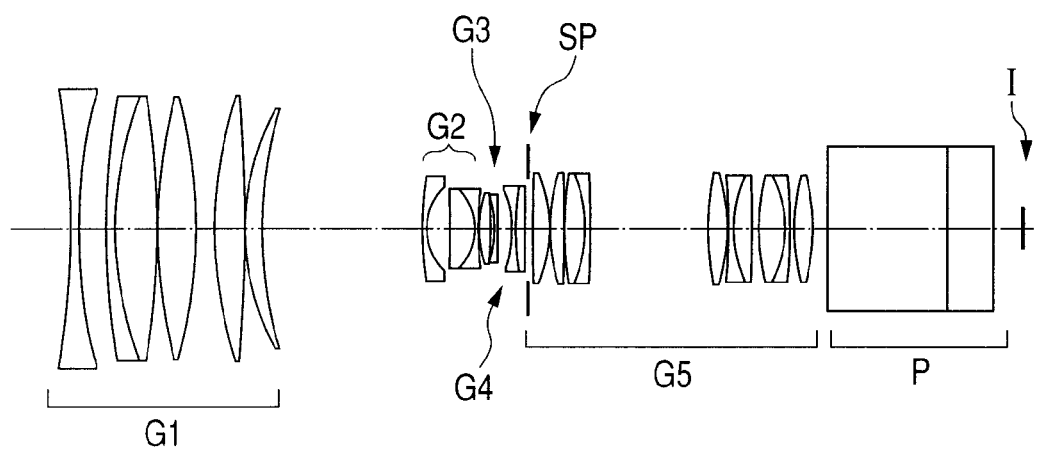

ZOOM LENS AND IMAGE PICKUP APPARATUS INCLUDING THE SAME

BACKGROUND OF THE INVENTION

1. Field of the Invention

The present invention relates to a zoom lens and an image pickup apparatus including the same, which are suitable for a broadcasting television camera, a video camera, a digital still camera, a silver halide film camera, and the like.

2. Description of the Related Art

In recent years, a zoom lens having a wide field angle, a high zoom ratio, and high optical performance is required for an image pickup apparatus such as a broadcasting television camera, a silver halide film camera, a digital camera, or a video camera. As a zoom lens having a wide field angle and a high zoom ratio, there is known a positive lead type five-unit zoom lens constituted of five lens units as a whole including a positive refractive power lens unit disposed closest to the object side. As this positive lead type zoom lens, there is known the five-unit zoom lens that is suitable for a television camera, in which a magnification lens unit having functions as a variator and a compensator is constituted of three movable lens units, which move in different loci in a zooming operation (see Japanese Patent Application Laid-Open No. H01-126614 or U.S. Pat. No. 4,874,231, and Japanese Patent Application Laid-Open No. H10-031157 or U.S. Pat. No. 5,808,809).

Japanese Patent Application Laid-Open No. H01-126614 proposes a zoom lens constituted of a first lens unit having positive refractive power, a second lens unit having negative refractive power for magnification, a third lens unit having negative refractive power, a fourth lens unit having positive refractive power, and a fifth lens unit having positive refractive power for imaging. In Japanese Patent Application Laid-Open No. H01-126614, the second, third, and fourth lens units constitute a magnification system. Japanese Patent Application Laid-Open No. H10-031157 proposes a zoom lens constituted of a first lens unit having positive refractive power, a second lens unit having negative refractive power and moving for zooming, a third lens unit having negative refractive power and moving for compensating an image plane variation according to the movement of the second lens unit, and a fourth lens unit having positive refractive power for imaging. Then the second lens unit having negative refractive power for magnification is constituted of a second A lens unit having negative refractive power and a second B lens unit having positive refractive power, so as to constitute the zoom lens by five lens units as a whole.

In the five-unit zoom lens described above, it is important to set appropriate refractive power and move condition in zooming operation of the magnification lens unit in order to obtain wide field angle, high zoom ratio and high optical performance over the entire zoom range. For instance, it is important to set appropriate refractive power and moving locus accompanying magnification of the second and third lens units for magnification, in particular, moving locus and the like in the zoom range from the wide angle end to the intermediate zoom position. If such structures are not set appropriately, it is difficult to realize a small size of the entire system and to obtain a zoom lens having a wide field angle, a high zoom ratio and high optical performance over the entire zoom range.

SUMMARY OF THE INVENTION

The present invention provides a zoom lens including, in order from an object side to an image side: a first lens unit having positive refractive power which does not move for zooming, and at least a part of which moves for focusing, a second lens unit having negative refractive power which moves for zooming, a third lens unit having positive refractive power which moves for zooming, a fourth lens unit having negative refractive power which moves for zooming; and a fifth lens unit having positive refractive power which does not move for zooming, in which when fW denotes a focal length of the entire system of the zoom lens at a wide angle end, and Z denotes a zoom ratio, a focal length fM at an intermediate zoom position is expressed by the following equation: $fM=fW \times \sqrt{Z}$, and when L2W denotes an interval between the second lens unit and the third lens unit at the wide angle end, and L2max denotes a maximum value of the interval between the second lens unit and the third lens unit in a zoom range from the wide angle end to the focal length fM, the following conditional expression is satisfied: $1.1 < L2max/L2W < 55.0$. The present invention also provides an image pickup apparatus including: the zoom lens described above; and a solid-state image pickup element which receives a light image formed by the zoom lens.

Further features of the present invention will become apparent from the following description of exemplary embodiments with reference to the attached drawings.

BRIEF DESCRIPTION OF THE DRAWINGS

FIGS. 5A, 5B, and 5C are cross sectional views at the wide angle end, the intermediate zoom position, and the telephoto end, respectively, of a zoom lens according to Numerical Embodiment 3 of the present invention.

DESCRIPTION OF THE EMBODIMENTS

Hereinafter, embodiments of the present invention are described in detail with reference to the attached drawings. It is an object of the present invention to provide a zoom lens having a wide field angle, a high zoom ratio, and high optical performance over the entire zoom range, and an image pickup apparatus including the zoom lens.

The zoom lens of the present invention includes, in order from an object side to an image side, a first lens unit having positive refractive power that does not move for zooming and that has a focusing function (focusing lens unit), and a second lens unit having negative refractive power for magnification that moves monotonously to the image side in the zooming operation from the wide angle end to the telephoto end. Here, the entire first lens unit may move or a part of the first lens unit may move in the focusing operation. The zoom lens of the present invention further includes a third lens unit having positive refractive power for magnification that moves nonlinearly to the image side in the zooming operation from the wide angle end to the telephoto end, and a fourth lens unit having negative refractive power that moves toward the object side so as to take a convex locus for compensating for image plane variation due to magnification. The zoom lens of the present invention further includes a fifth lens unit having positive refractive power that does not move for zooming. Here, the expression "a lens unit does not move for zooming" means that the lens unit is not driven to move for a purpose of the zooming operation but the first lens unit may move for focusing in the case where the zooming operation and the focusing operation are performed simultaneously. In addition, only the example where the entire zoom lens is constituted of five lens units is described in the present invention, but it should be understood that the present invention can be applied to a case where the entire zoom lens is constituted of six lens units or seven lens units.

Figure 1A:
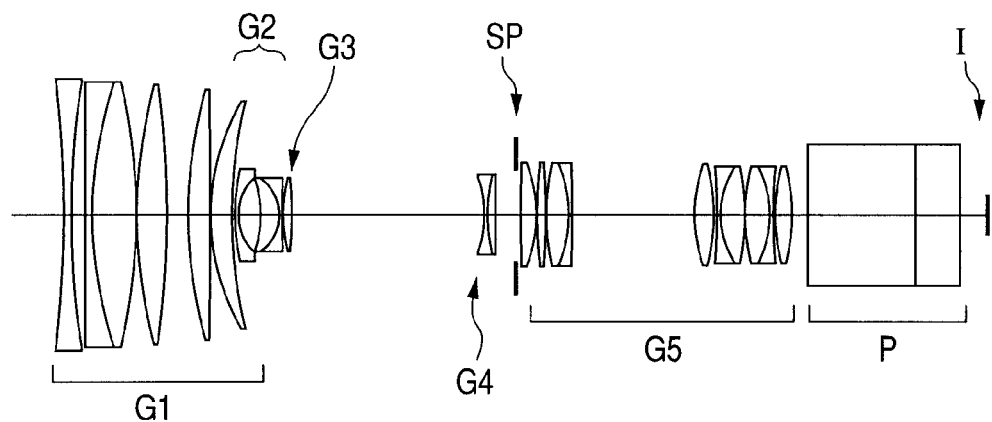
FIGS. 1A, 1B, and 1C are cross sectional views at the wide angle end, the intermediate zoom position, and the telephoto end, respectively, of a zoom lens according to Numerical Embodiment 1 of the present invention.
Figure 1B:
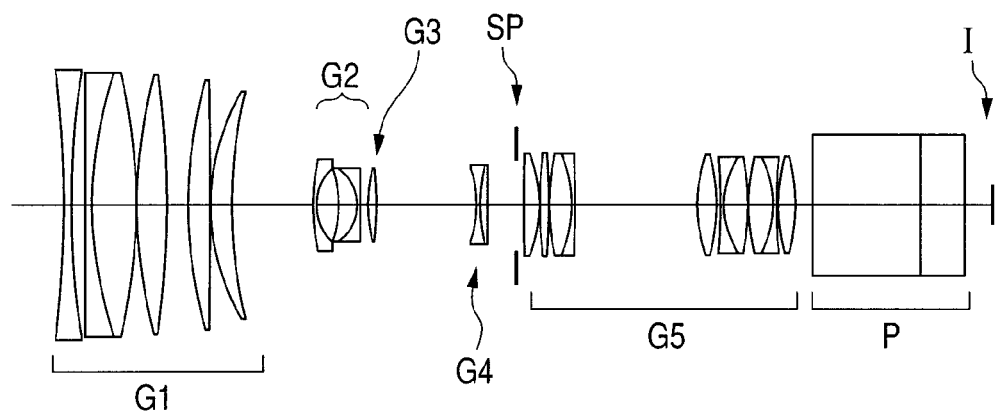
Figure 1C:
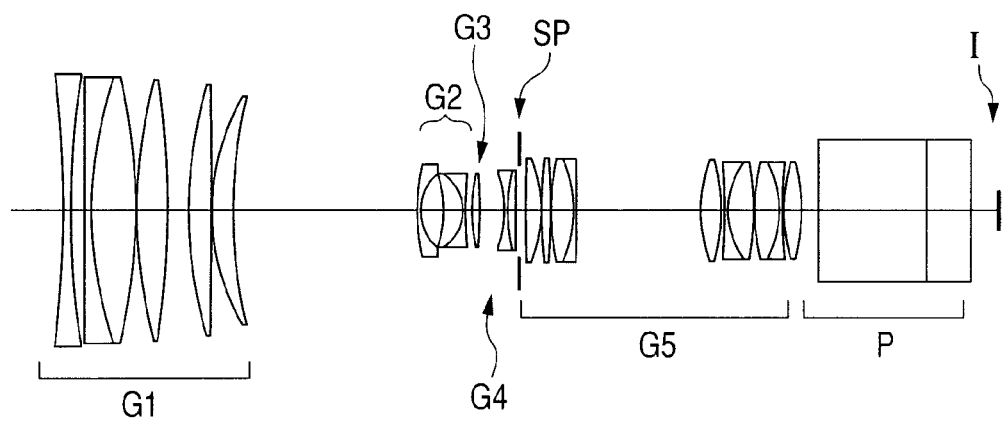
Figure 2A:
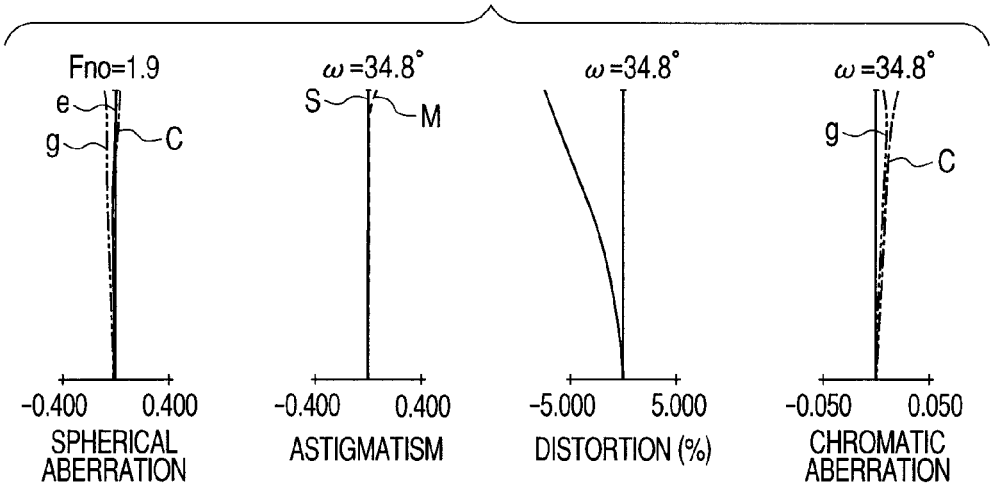
FIGS. 2A, 2B, and 2C are aberration diagrams at the wide angle end, the intermediate zoom position, and the telephoto end, respectively, according to Numerical Embodiment 1 of the present invention.
Figure 2B:
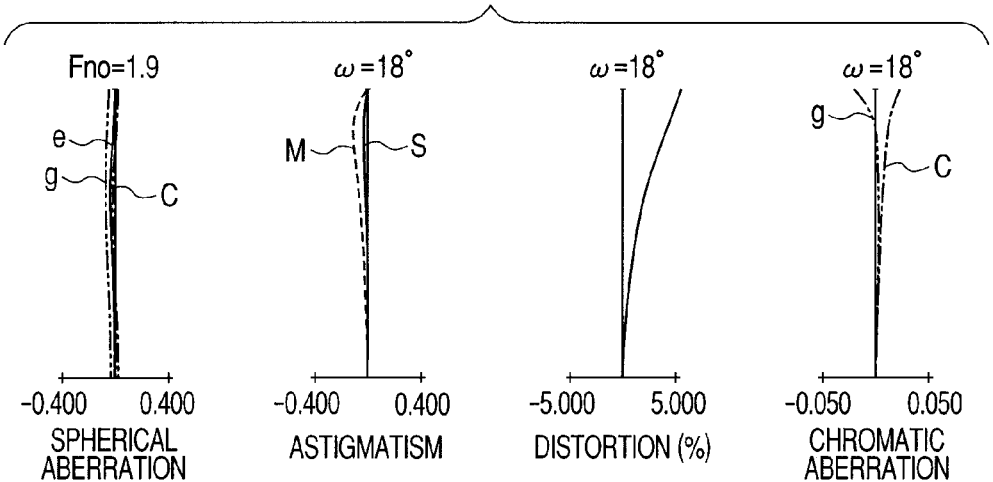
Figure 2C:
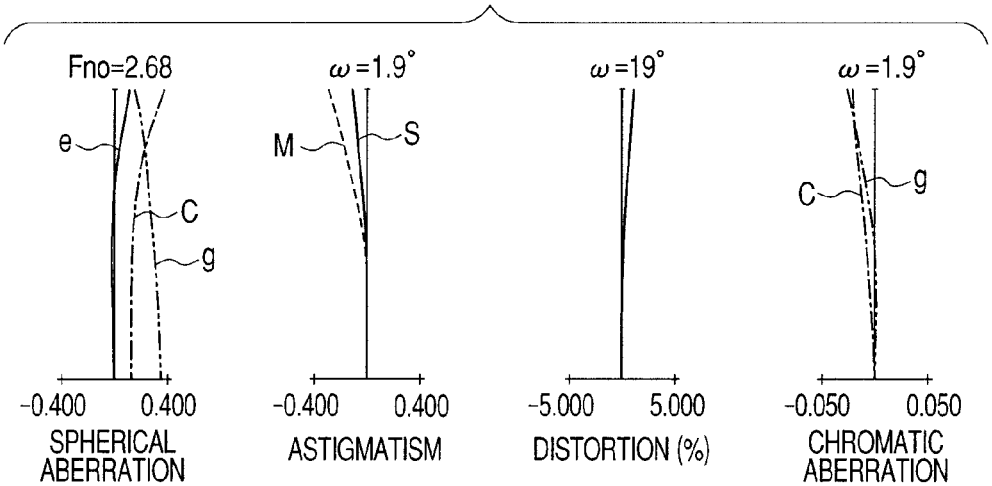

FIGS. 1A, 1B, and 1C are cross sectional views at the wide angle end (short focal length end), at the focal length f=16.91 mm, and at the telephoto end (long focal length end), respectively, of a zoom lens of Numerical Embodiment 1 as Embodiment 1 of the present invention. FIGS. 2A, 2B, and 2C are aberration diagrams at the wide angle end, at the focal length f=16.91 mm, and at the telephoto end, respectively, of Numerical Embodiment 1. The zoom lens of Numerical Embodiment 1 has an image taking field angle of 34.85 degrees (focal length of 7.9 mm) at the wide angle end and a zoom ratio of 21.0. Here, values of a focal length and an object distance are values of numerical embodiments described later expressed in mm. The object distance is a distance from the image plane. The same is true in each embodiment described below.

Figure 3A:
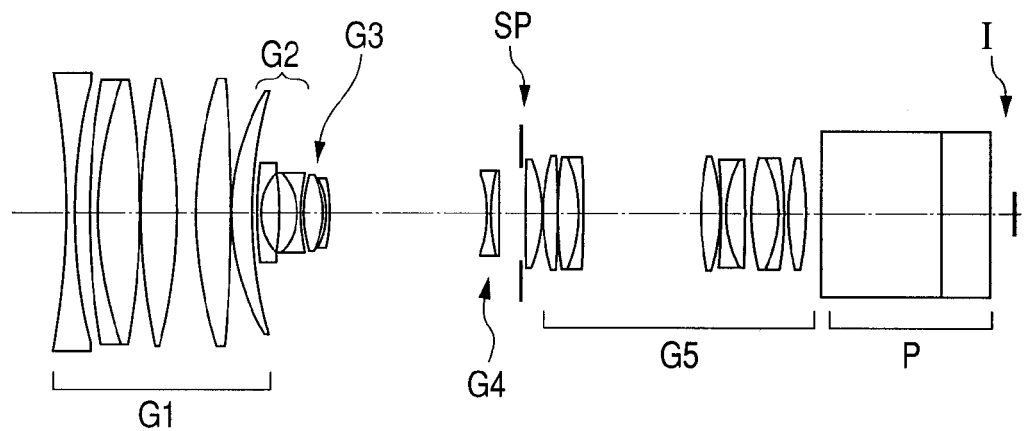
FIGS. 3A, 3B, and 3C are cross sectional views at the wide angle end, the intermediate zoom position, and the telephoto end, respectively, of a zoom lens according to Numerical Embodiment 2 of the present invention.
Figure 3B:
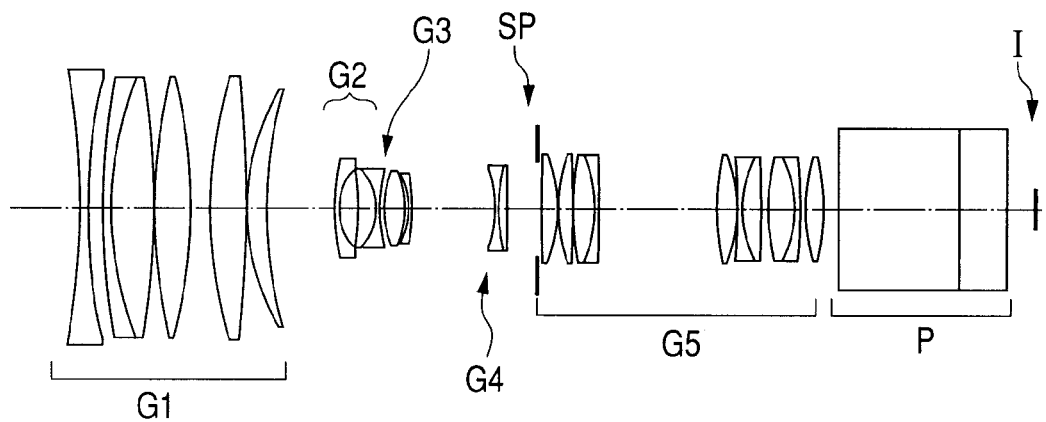
Figure 3C:
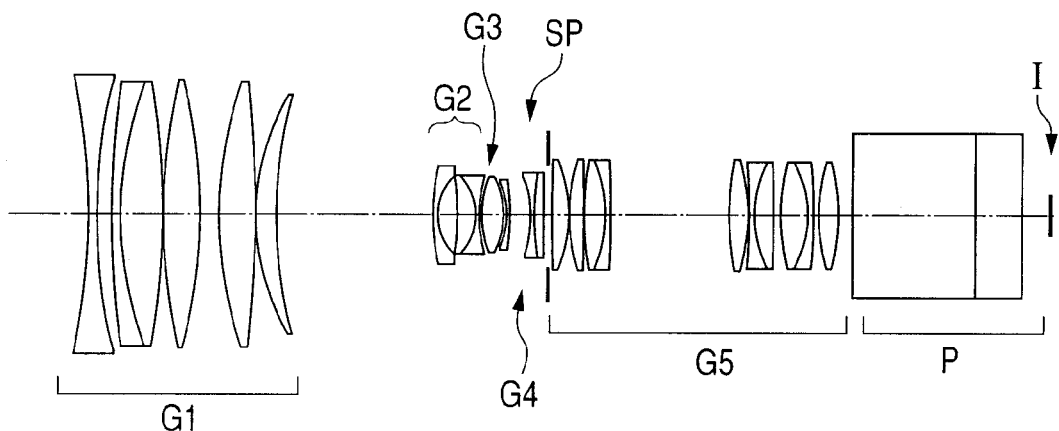
Figure 4A:
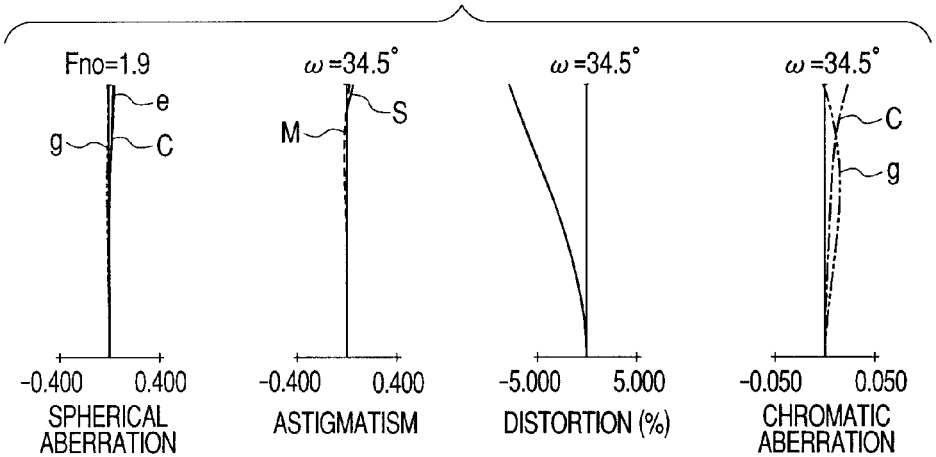
FIGS. 4A, 4B, and 4C are aberration diagrams at the wide angle end, the intermediate zoom position, and the telephoto end, respectively, according to Numerical Embodiment 2 of the present invention.
Figure 4B:
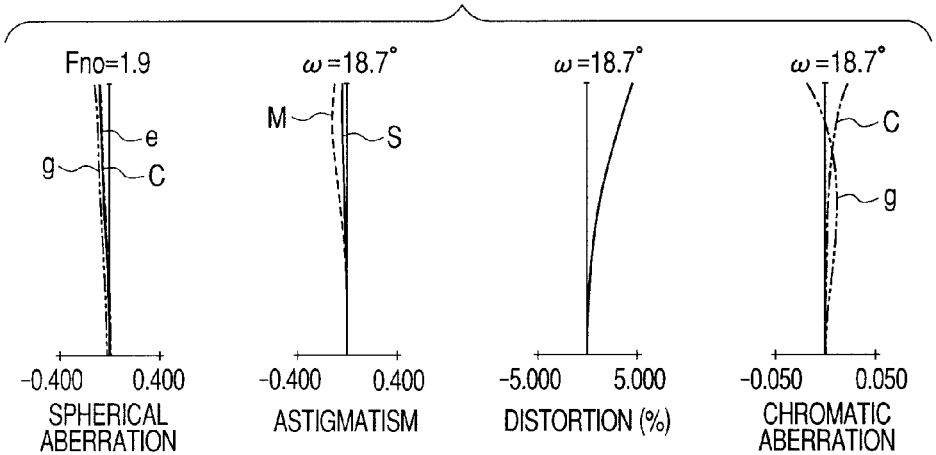
Figure 4C:
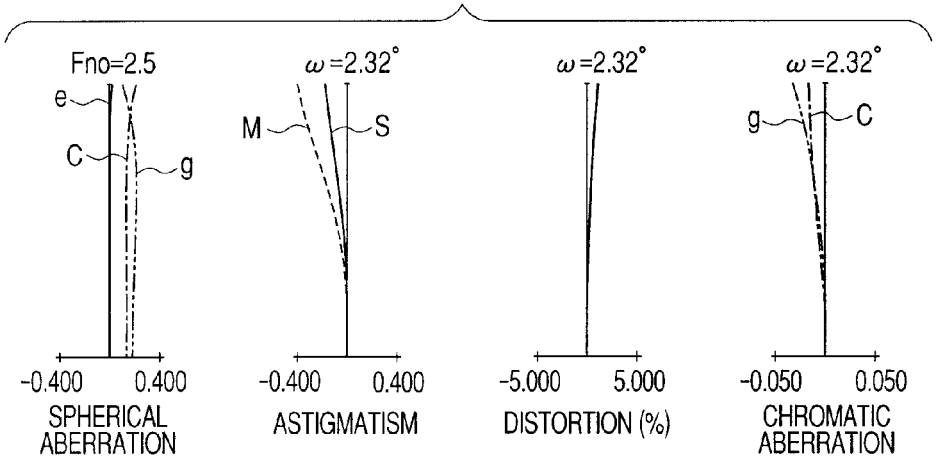

FIGS. 3A, 3B, and 3C are cross sectional views at the wide angle end, at the focal length f=16.24 mm, and at the telephoto end, respectively, of a zoom lens of Numerical Embodiment 2 as Embodiment 2 of the present invention. FIGS. 4A, 4B, and 4C are aberration diagrams at the wide angle end, at the focal length f=16.24 mm, and at the telephoto end, respectively, of Numerical Embodiment 2. The zoom lens of Numerical Embodiment 2 has an image taking field angle of 34.51 degrees (focal length of 8.00 mm) at the wide angle end and a zoom ratio of 17.00.

Figure 6A:
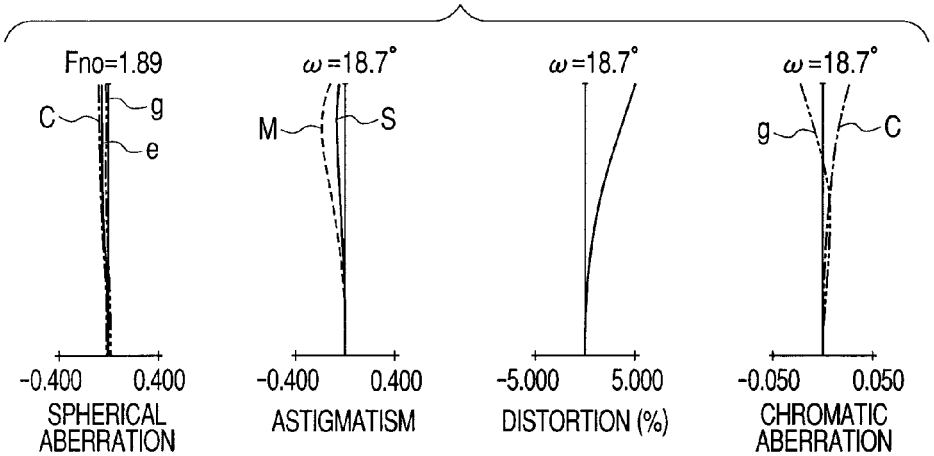
FIGS. 6A, 6B, and 6C are aberration diagrams at the wide angle end, the intermediate zoom position, and the telephoto end, respectively, according to Numerical Embodiment 3 of the present invention.
Figure 6B:
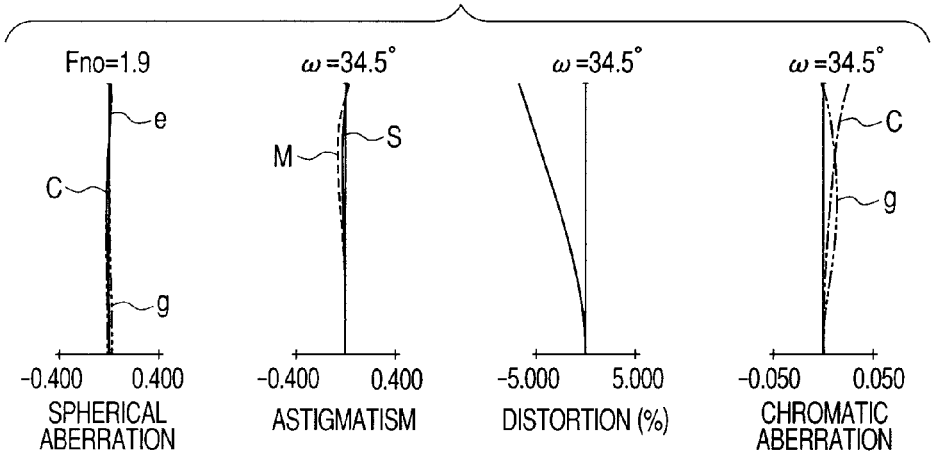
Figure 6C:
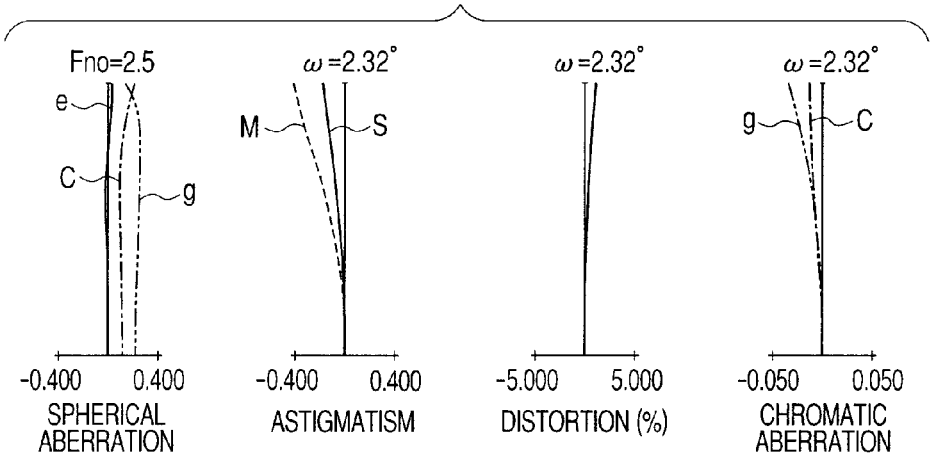

FIGS. 5A, 5B, and 5C are cross sectional views at the wide angle end, at the focal length f=16.24 mm, and at the telephoto end, respectively, of a zoom lens of Numerical Embodiment 3 as Embodiment 3 of the present invention. FIGS. 6A, 6B, and 6C are aberration diagrams at the wide angle end, at the focal length f=16.24 mm, and at the telephoto end, respectively, of Numerical Embodiment 3. The zoom lens of Numerical Embodiment 3 has an image taking field angle of 34.51 degrees (focal length of 8.00 mm) at the wide angle end and a zoom ratio of 17.00.

Figure 7A:
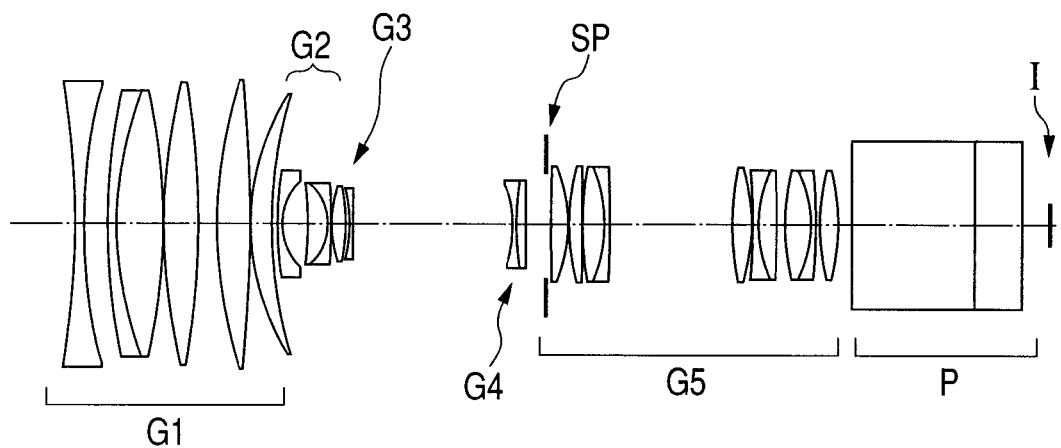
FIGS. 7A, 7B, and 7C are cross sectional views at the wide angle end, the intermediate zoom position, and the telephoto end, respectively, of a zoom lens according to Numerical Embodiment 4 of the present invention.
Figure 7B:
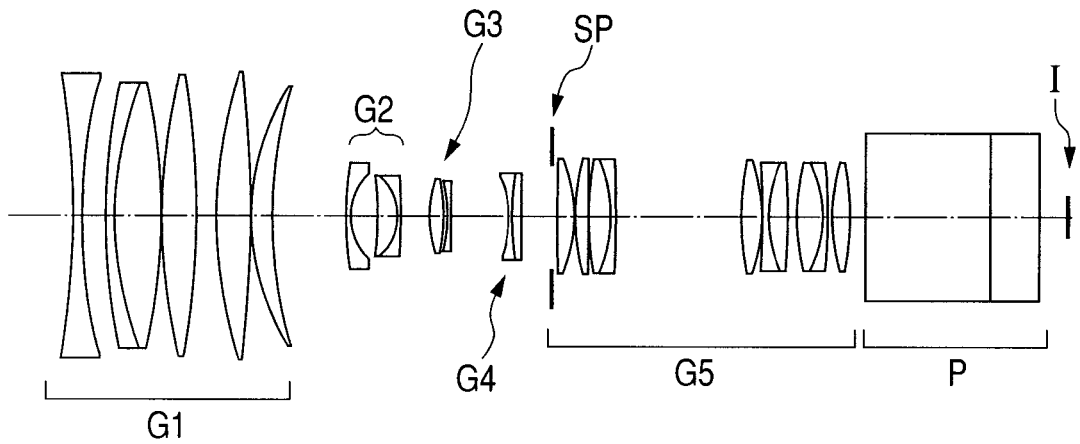
Figure 7C:
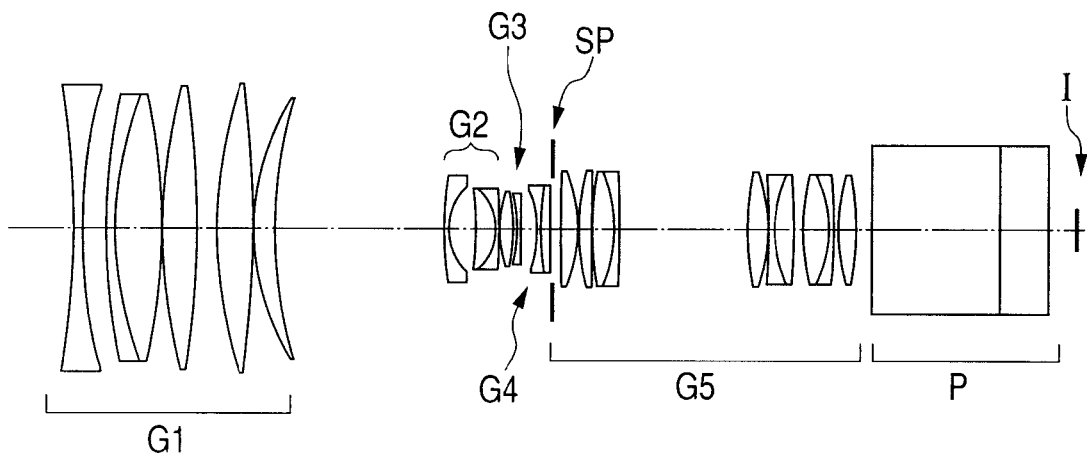
Figure 8A:
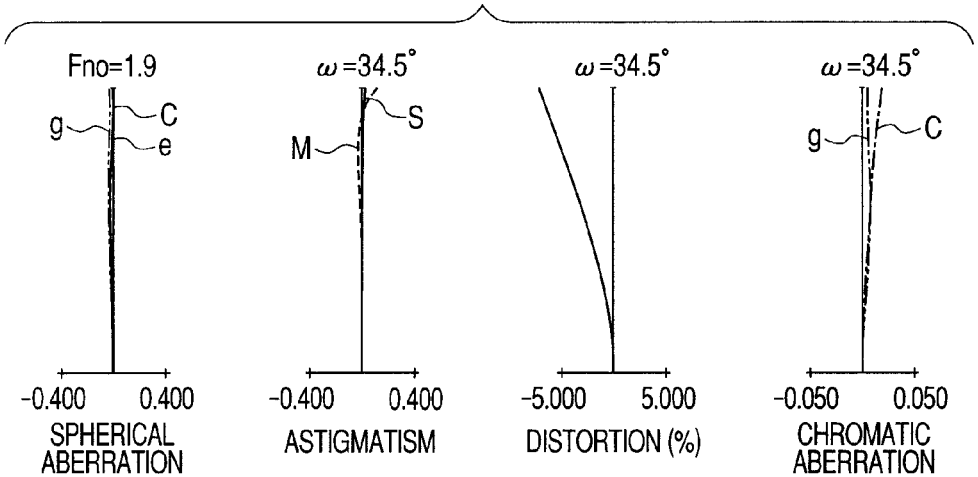
FIGS. 8A, 8B, and 8C are aberration diagrams at the wide angle end, the intermediate zoom position, and the telephoto end, respectively, according to Numerical Embodiment 4 of the present invention.
Figure 8B:
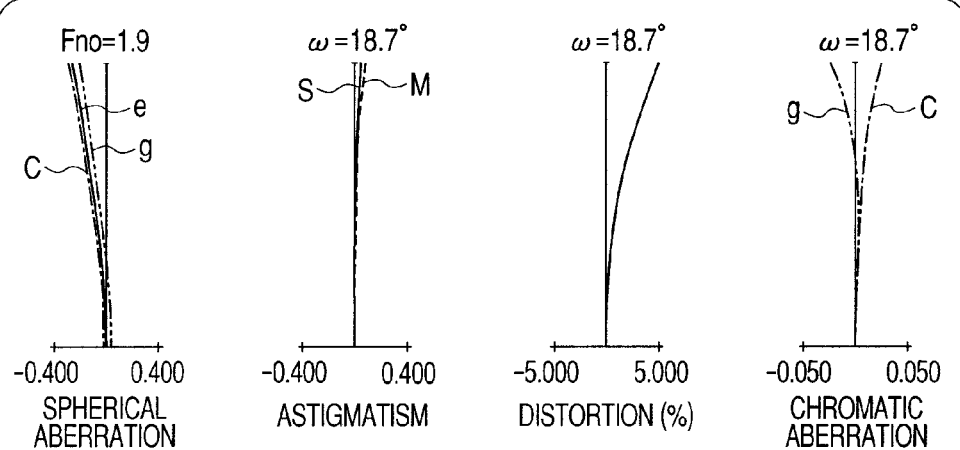
Figure 8C:
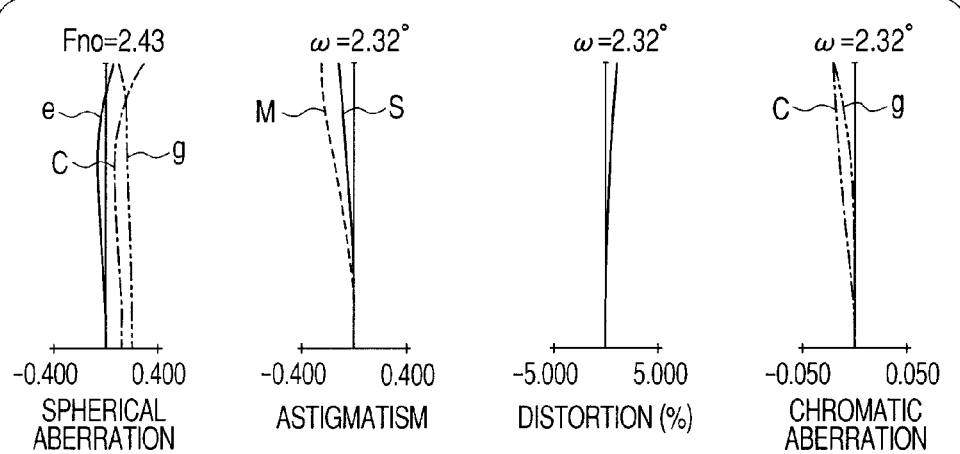

FIGS. 7A, 7B, and 7C are cross sectional views at the wide angle end, at the focal length f=16.24 mm, and at the telephoto end, respectively, of a zoom lens of Numerical Embodiment 4 as Embodiment 4 of the present invention. FIGS. 8A, 8B, and 8C are aberration diagrams at the wide angle end, at the focal length f=16.24 mm, and at the telephoto end, respectively, of Numerical Embodiment 4. The zoom lens of Numerical Embodiment 4 has an image taking field angle of 34.51 degrees (focal length of 8.00 mm) at the wide angle end and a zoom ratio of 17.00.

Figure 9A:
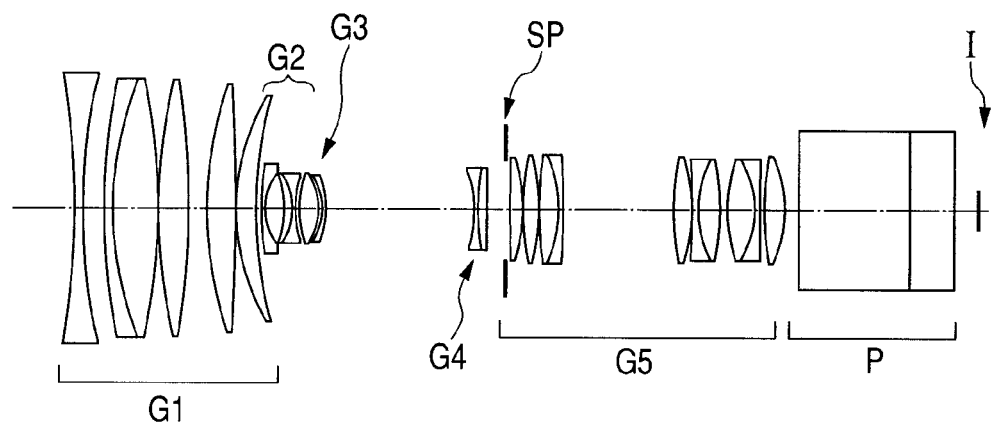
FIGS. 9A, 9B, and 9C are cross sectional views at the wide angle end, the intermediate zoom position, and the telephoto end, respectively, of a zoom lens according to Numerical Embodiment 5 of the present invention.
Figure 9B:
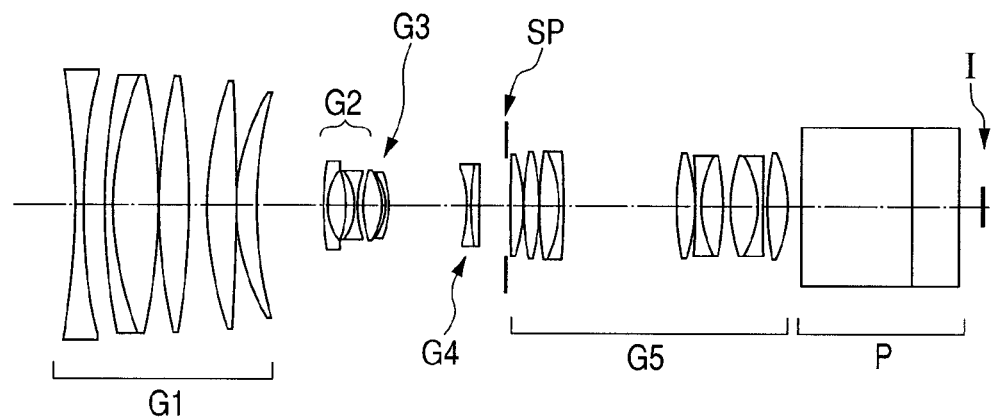
Figure 9C:
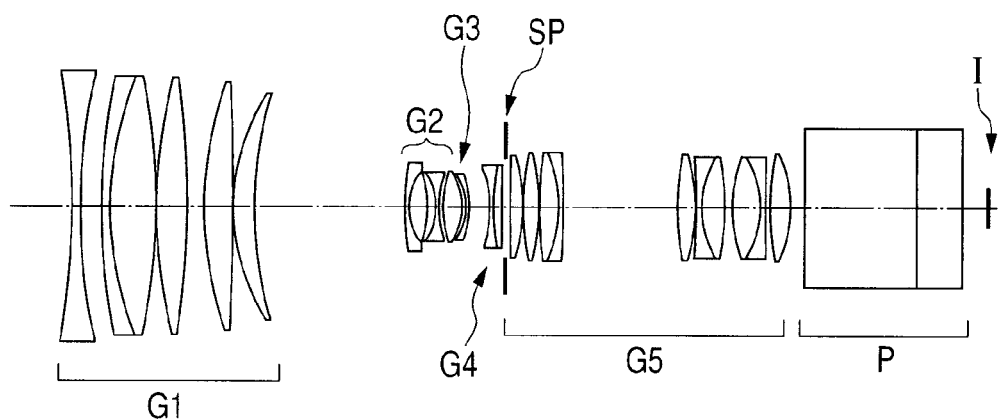
Figure 10A:
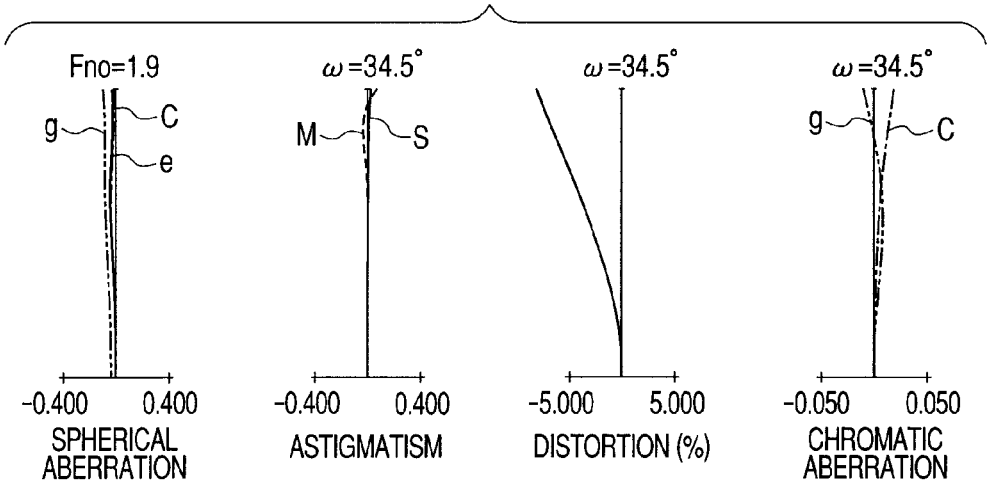
FIGS. 10A, 10B, and 10C are aberration diagrams at the wide angle end, the intermediate zoom position, and the telephoto end, respectively, according to Numerical Embodiment 5 of the present invention.
Figure 10B:
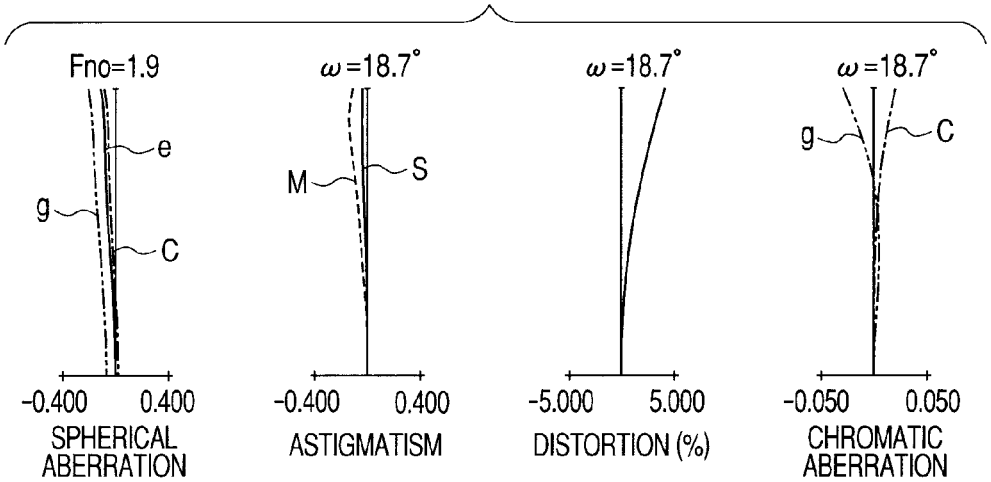
Figure 10C:
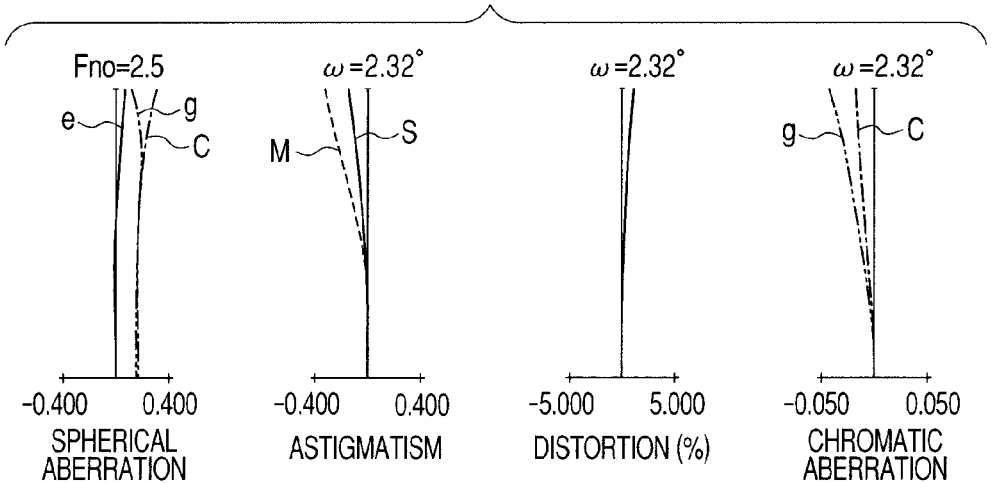

FIGS. 9A, 9B, and 9C are cross sectional views at the wide angle end, at the focal length f=16.24 mm, and at the telephoto end, respectively, of a zoom lens of Numerical Embodiment 5 as Embodiment 5 of the present invention. FIGS. 10A, 10B, and 10C are aberration diagrams at the wide angle end, at the focal length f=16.24 mm, and at the telephoto end, respectively, of Numerical Embodiment 5. The zoom lens of Numerical Embodiment 5 has an image taking field angle of 34.51 degrees (focal length of 8.00 mm) at the wide angle end and a zoom ratio of 17.00.

Figure 11A:
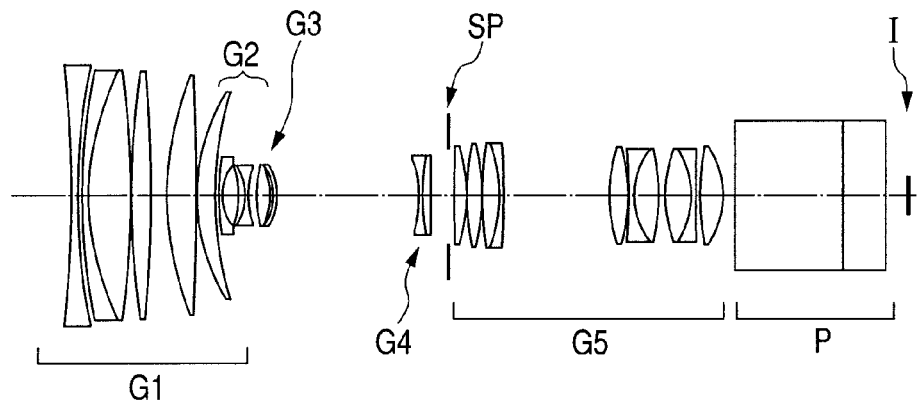
FIGS. 11A, 11B, and 11C are cross sectional views at the wide angle end, the intermediate zoom position, and the telephoto end, respectively, of a zoom lens according to Numerical Embodiment 6 of the present invention.
Figure 11B:
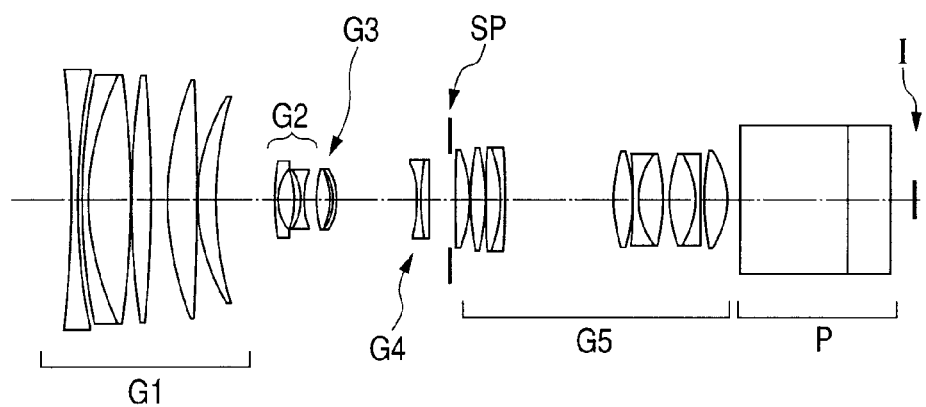
Figure 11C:
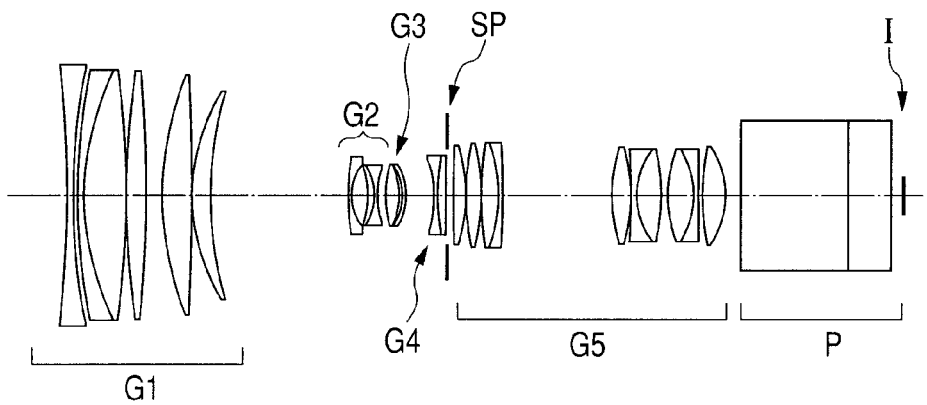
Figure 12A:
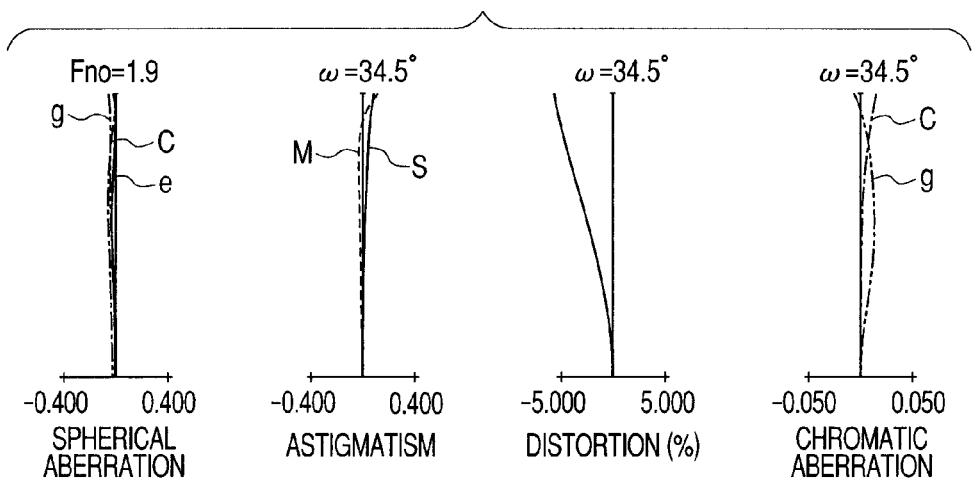
FIGS. 12A, 12B, and 12C are aberration diagrams at the wide angle end, the intermediate zoom position, and the telephoto end, respectively, according to Numerical Embodiment 6 of the present invention.
Figure 12B:
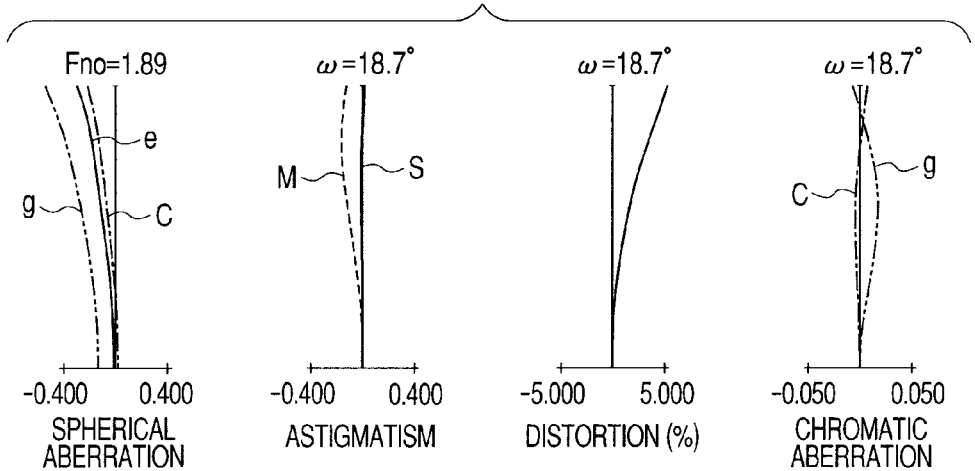
Figure 12C:
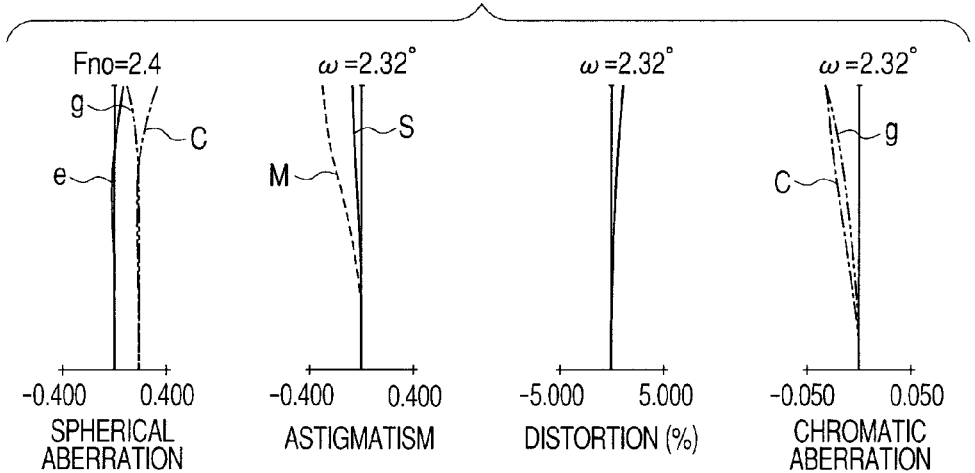

FIGS. 11A, 11B, and 11C are cross sectional views at the wide angle end, at the focal length f=16.24 mm, and at the telephoto end, respectively, of a zoom lens of Numerical Embodiment 6 as Embodiment 6 of the present invention. FIGS. 12A, 12B, and 12C are aberration diagrams at the wide angle end, at the focal length f=16.24 mm, and at the telephoto end, respectively, of Numerical Embodiment 6. The zoom lens of Numerical Embodiment 6 has an image taking field angle of 34.51 degrees (focal length of 8.00 mm) at the wide angle end and a zoom ratio of 17.00.

Figure 13A:
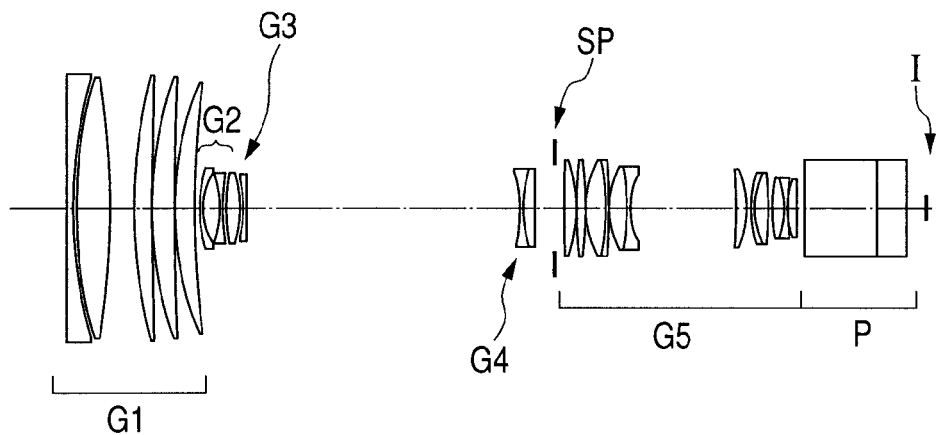
FIGS. 13A, 13B, and 13C are cross sectional views at the wide angle end, the intermediate zoom position, and the telephoto end, respectively, of a zoom lens according to Numerical Embodiment 7 of the present invention.
Figure 13B:
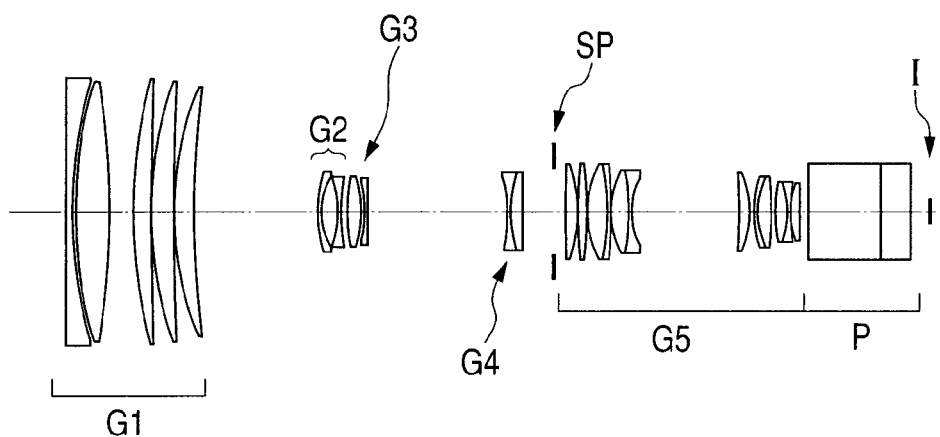
Figure 13C:
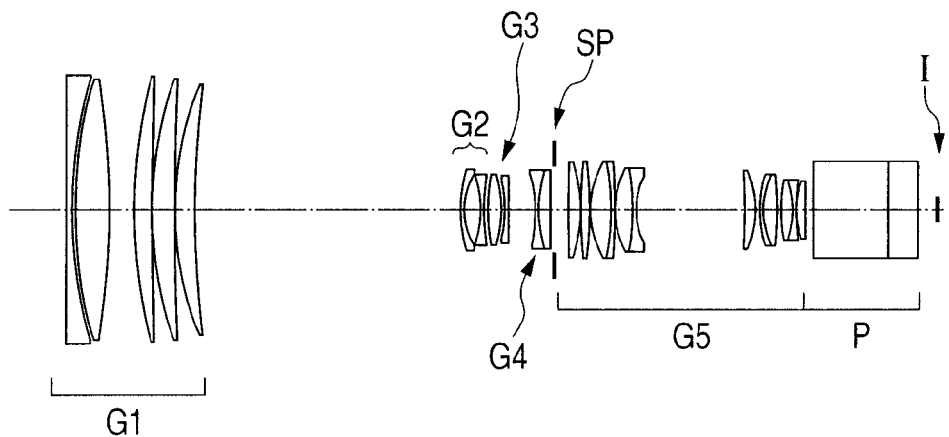
Figure 14A:
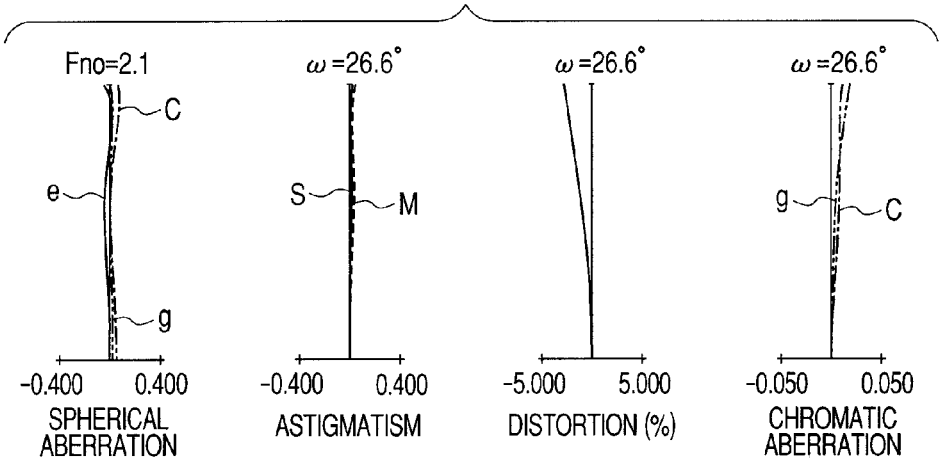
FIGS. 14A, 14B, and 14C are aberration diagrams at the wide angle end, the intermediate zoom position, and the telephoto end, respectively, according to Numerical Embodiment 7 of the present invention.
Figure 14B:
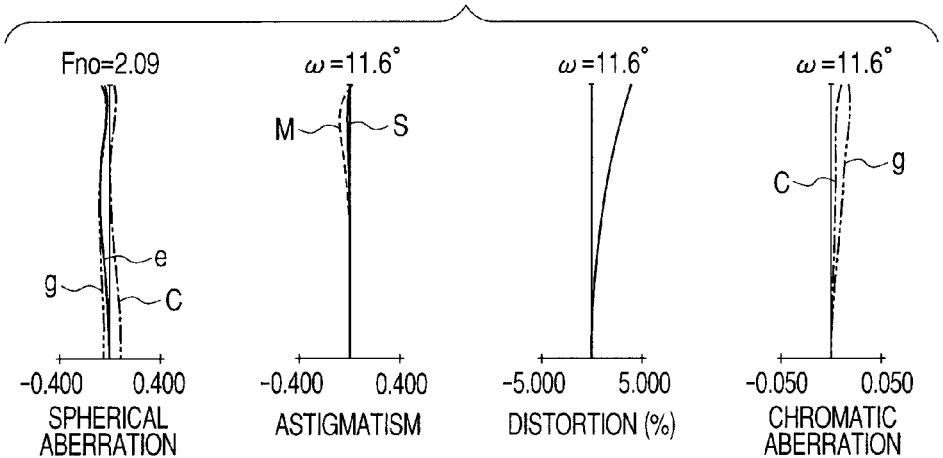
Figure 14C:
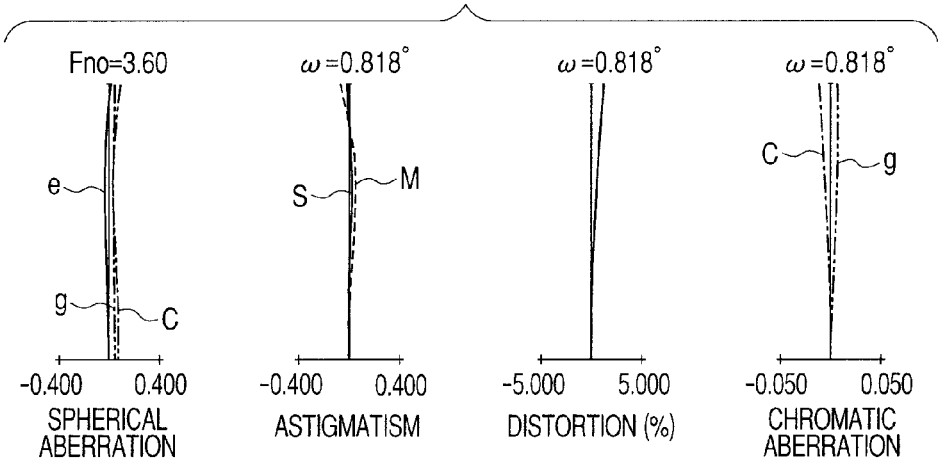

FIGS. 13A, 13B, and 13C are cross sectional views at the wide angle end, at the focal length f=26.76 mm, and at the telephoto end, respectively, of a zoom lens of Numerical Embodiment 7 as Embodiment 7 of the present invention. FIGS. 14A, 14B, and 14C are aberration diagrams at the wide angle end, at the focal length f=26.76 mm, and at the telephoto end, respectively, of Numerical Embodiment 7. The zoom lens of Numerical Embodiment 7 has an image taking field angle of 26.57 degrees (focal length of 11.00 mm) at the wide angle end and a zoom ratio of 35.00.

Figure 15A:
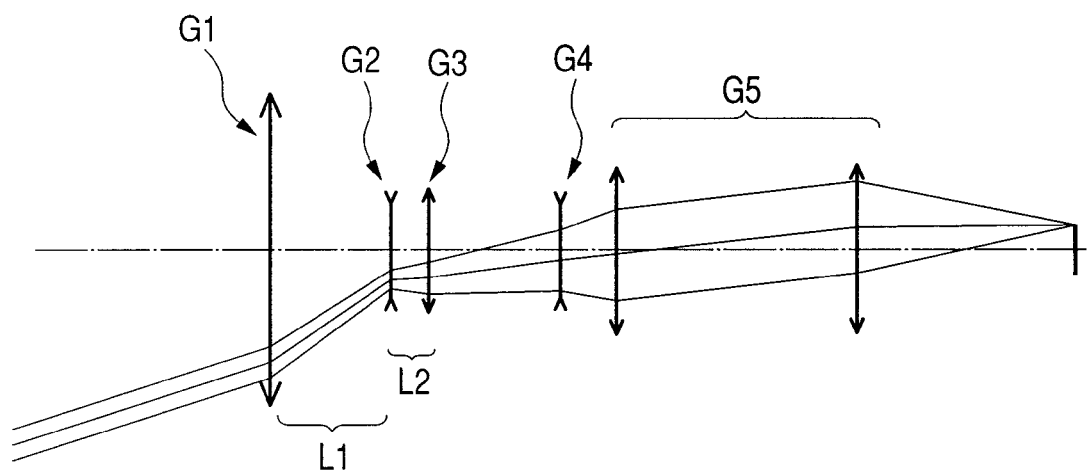
FIGS. 15A and 15B are explanatory diagrams of paraxial refractive power arrangements of the zoom lens of the present invention.
Figure 15B:
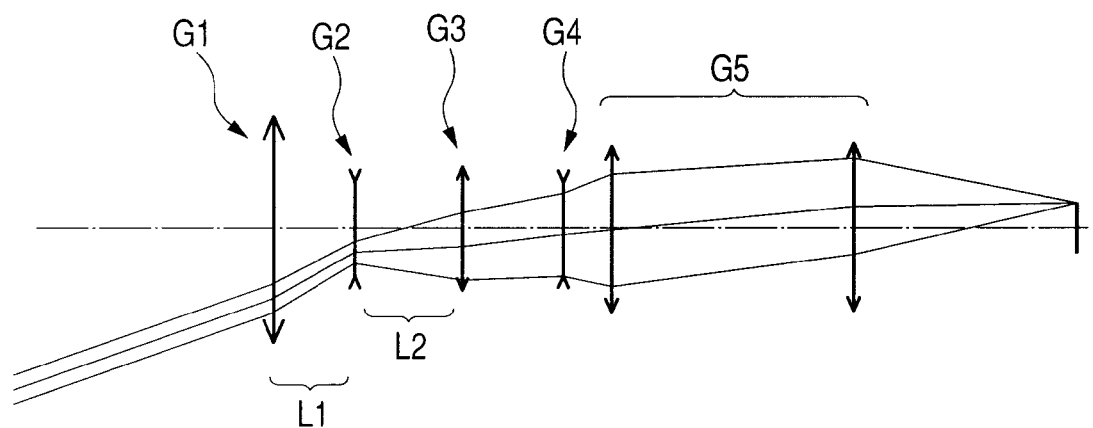
Figure 16:
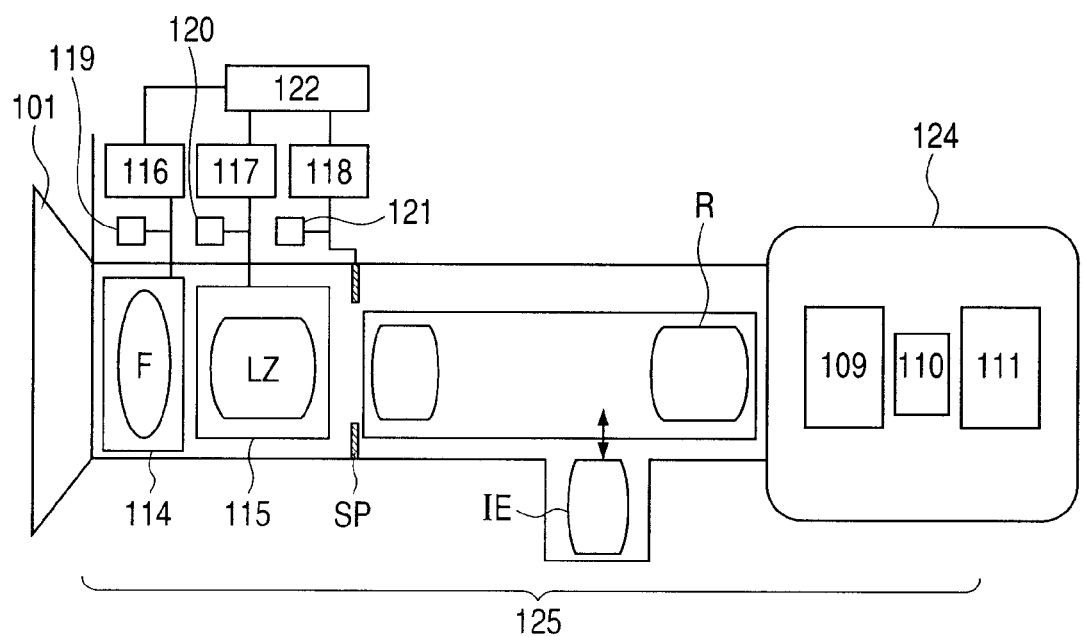
FIG. 16 is a schematic diagram of a main part of an image pickup apparatus of the present invention.

FIGS. 15A and 15B are explanatory diagrams of paraxial refractive power arrangements of the zoom lens of the present invention. FIG. 16 is a schematic diagram of the image pickup apparatus of the present invention.

The zoom lens of each embodiment is an image pickup lens system that is used for an image pickup apparatus such as a broadcasting television camera, a video camera, or a digital camera. In the cross sectional views of the zoom lens, the left side is the object side (front) and the right side is the image side (rear).

As illustrated in the cross sectional views, the zoom lens includes: a front lens unit (first lens unit) G1 having positive refractive power (optical power that is the inverse number of the focal length) that includes a focusing lens unit; a variator (second lens unit) G2 having negative refractive power for magnification, which is moved monotonously toward the image plane side on the optical axis, so that the zooming operation from the wide angle end to the telephoto end is performed; a variator (third lens unit) G3 having positive refractive power for magnification, which is moved on the optical axis toward the image plane side so as to take a curve, so that the zooming operation from the wide angle end to the telephoto end is performed; and a compensator (fourth lens unit) G4 having negative refractive power, which is moved on the optical axis toward the object side non-linearly (so as to take a convex locus) for compensating for image plane variation due to magnification.

In each embodiment, the lens unit for compensating for the image plane variation due to magnification is the fourth lens unit G4, but it is possible to use the third lens unit G3 as a lens unit for compensating for the image plane variation. The zoom lens further includes an aperture stop SP and a fixed relay unit (fifth lens unit) G5 having positive refractive power for imaging action. It is possible to extend the entire first lens unit G1 or a part thereof, or a part of the fifth lens unit G5 so as to perform the focusing operation from an object at infinite position to an object at close distance. The zoom lens further includes a color separation prism or an optical filter P, which is illustrated as a glass block, and an image plane I corresponding to an image pickup surface of a solid-state image pickup element (photoelectric conversion element).

In each embodiment, fw denotes a focal length of the entire system at the wide angle end, and Z denotes a zoom ratio. Further, a focal length fM at the intermediate zoom position is expressed by the equation below.

$$fM = fW \times \sqrt{Z} \quad \text{(Equation 2)}$$

An interval between the second lens unit G2 and the third lens unit G3 at the wide angle end is denoted by L2W. In the zoom range from the wide angle end to the focal length fM, a maximum value of the interval between the second lens unit G2 and the third lens unit G3 is denoted by L2max. In this case, the following conditional expression is satisfied.

$$1.1 < L2max/L2W < 55.0 \quad (1)$$

The conditional expression (1) defines the interval between the second lens unit G2 and the third lens unit G3 as well as the focal length appropriately at the wide angle end and at the zoom position of the focal length fM, so that a lens effective diameter of the first lens unit G1 is decreased.

In the five-unit zoom lens of the same zoom type as that in each embodiment, if the image taking field angle is narrow and if the zoom ratio is low (small), the lens effective diameter of the first lens unit on the object side is determined based on an incident height of an off-axis light beam at the wide angle end. However, in the zoom lens of this embodiment having a high zoom ratio and the wide field angle, necessary movement amounts of the second lens unit G2 and the third lens unit G3 due to zooming are outstandingly large. Therefore, the second lens unit G2 moves backward toward the image plane side before the image taking field angle becomes small. Therefore, an off-axis light beam entering the first lens unit G1 in the zoom intermediate range from the focal length fW to the focal length fM with a little magnification from the wide angle end toward the telephoto side is highest.

In the zoom lens of each embodiment, the interval (air interval) between the second lens unit G2 and the third lens unit G3 and the moving loci thereof accompanying zooming are set appropriately. Thus, the height of the incident position of the off-axis light beam in the first lens unit G1 in the zoom intermediate range from the focal length fW to the focal length fM is decreased, so as to prevent the lens diameter of the first lens unit G1 from increasing. Specifically, the magnification lens unit is constituted of the second lens unit G2, the third lens unit G3, and the fourth lens unit G4, and the second lens unit G2 moves monotonously on the optical axis toward the image plane side along with the magnification from the wide angle end to the telephoto end. The third lens unit G3 moves non-linearly (so as to take a curve) on the optical axis toward the image plane side along with the magnification. The interval between the second lens unit G2 and the third lens unit G3 is decreased at the wide angle end and is increased in the zoom intermediate range from the focal length fW to the focal length fM.

Here, the third lens unit G3 in each embodiment has a positive lateral zooming factor β3. Therefore, the focal length of the entire system is increased by moving toward the image pickup surface side while the focal length of the entire system is decreased by moving toward the object side. Therefore, if the third lens unit G3 has the above-mentioned moving locus at the wide angle end, the third lens unit G3 moves toward the object side so that the focal length of the entire system is decreased. Therefore, this structure is advantageous for realizing a wide field angle of the entire lens system. In addition, in the zoom intermediate range from the focal length fW to the focal length fM, the third lens unit G3 moves toward the image pickup surface side, so that the focal length of the entire system is increased. Therefore, the interval L1 between the first lens unit G1 and the second lens unit G2 is maintained to be short, while the interval L2 between the second lens unit G2 and the third lens unit G3 is increased so that the focal length of the entire system is increased. Thus, in each embodiment, compared with the case where the interval L2 is constant from the wide angle end in the zoom intermediate range from the focal length fW to the focal length fM, the interval L1 can be maintained to be short. Thus, the incident height of the off-axis light beam in the first lens unit G1 is decreased, so as to prevent the lens diameter of the first lens unit G1 from being increased.

FIGS. 15A and 15B illustrate paraxial refractive power arrangements of the zoom lens in the zoom intermediate range in the case where the interval L2 is constant from the zoom position of the wide angle end and in the case where the interval L2 is increased, respectively. It is understood that the interval L1 between the first lens unit G1 and the second lens unit G2 can be maintained to be shorter in the case of FIG. 15B where the interval L2 is increased than in the case of FIG. 15A where the interval L2 is constant from the wide angle end. Thus, the incident height of the off-axis light beam in the first lens unit G1 is decreased, so that the lens diameter of the first lens unit G1 is decreased. The conditional expression (1) defines the interval between the second lens unit G2 and the third lens unit G3 in the zooming operation from the wide angle end to the telephoto end. By setting the interval L2 to be short at the wide angle end, the wide field angle can be realized easily. In addition, by increasing the interval L2 in the zoom intermediate range, particularly in the range from the focal length fW to the focal length fM, an increase of the interval between the first lens unit G1 and the second lens unit G2 is suppressed, while the focal length of the third lens unit G3 is increased. Thus, the incident height of the off-axis light beam in the first lens unit G1 is suppressed in the zoom intermediate range, so that small size and light weight of the first lens unit G1 are achieved.

Above the upper limit of the conditional expression (1), the interval between the second lens unit G2 and the third lens unit G3 is increased in the zoom intermediate range, so that the incident height of the axial light beam in the third lens unit G3 increases. Therefore, variations of the spherical aberration, the coma aberration, and the like in the zoom intermediate range increase, and hence it becomes difficult to achieve good optical performance. Below the lower limit of the conditional expression (1), the interval between the second lens unit G2 and the third lens unit G3 is decreased in the zoom intermediate range, so that the effect of suppressing the incident height of the off-axis light beam in the first lens unit G1 is decreased. Thus, it becomes difficult to realize small size and light weight of the first lens unit G1. Further, it is preferred to set the numerical value range of the conditional expression (1) as follows.

$$1.13 < L2max/L2W < 53.00 \tag{1a}$$

Furthermore, it is preferable to satisfy the numerical value range of the conditional expression (1b) as follows.

$$1.20 < L2max/L2W < 7.00 \tag{1b}$$

With the above-mentioned structure in each embodiment, the zoom lens of small size and light weight having a wide field angle and a high zoom ratio can be achieved. In each embodiment, it is more preferred to satisfy one or more of the following conditions. The focal lengths of the first, second, and third lens units G1, G2, and G3 are denoted by f1, f2 and f3, respectively. A combined focal length f23 of the second lens unit G2 and the third lens unit G3 is expressed as follows.

$$f23 = \frac{f2 \times f3}{f2 + f3} \tag{Equation 3}$$

Here, it is preferred to satisfy one or more of the following conditions.

$$2.3 < |f3/f23| < 33.0 \tag{2}$$

$$4.0 < |f1/f23| < 8.0 \tag{3}$$

$$3.3 < |f3/f2| < 33.0 \tag{4}$$

$$5.0 < |f3/L2max| < 420.0 \tag{5}$$

The conditional expression (2) defines a ratio of the focal length of the third lens unit G3 to the combined focal length of the second and third lens units G2 and G3. Above the upper limit of the conditional expression (2), the refractive power of the third lens unit G3 is decreased. As a result, the effect of increasing the focal length in the zoom intermediate range by the third lens unit G3 is decreased, and it becomes difficult to achieve small size and light weight of the first lens unit G1. Below the lower limit of the conditional expression (2), the refractive power of the third lens unit G3 is increased. As a result, spherical aberration, coma aberration, and the like in the zoom intermediate range increase, and hence it becomes difficult to obtain good optical performance.

The conditional expression (3) defines a ratio of the focal length of the first lens unit G1 to the combined focal length of the second and third lens units G2 and G3. Above the upper limit of the conditional expression (3), the refractive powers of the second lens unit G2 and the third lens unit G3 become large compared with the refractive power of the first lens unit G1. As a result, variations of various aberrations increase, and hence it becomes difficult to obtain good optical performance. Below the lower limit of the conditional expression (3), the refractive powers of the second lens unit G2 and the third lens unit G3 become too small compared with the refractive power of the first lens unit G1. As a result, it becomes difficult to realize a high zoom ratio.

The conditional expression (4) defines a ratio of the focal length of the third lens unit G3 to the focal length of the second lens unit G2. Above the upper limit of the conditional expression (4), the refractive power of the third lens unit G3 is decreased. As a result, the effect of increasing the focal length in the zoom intermediate range by the third lens unit G3 is decreased, and hence it becomes difficult to realize small size and light weight of the first lens unit G1. Below the lower limit of the conditional expression (4), the refractive power of the third lens unit G3 is increased. As a result, spherical aberration, coma aberration, and the like in the zoom intermediate range increase, and hence it becomes difficult to obtain good optical performance.

The conditional expression (5) defines a ratio of the focal length of the third lens unit G3 to the interval between the second lens unit G2 and the third lens unit G3. Above the upper limit of the conditional expression (5), the refractive power of the third lens unit G3 is decreased, and the interval between the second lens unit G2 and the third lens unit G3 in the zoom intermediate range is decreased. Therefore, the effect of increasing the focal length in the zoom intermediate range by the third lens unit G3 is decreased. As a result, it becomes difficult to suppress the incident height of the off-axis light beam in the first lens unit G1, and it becomes difficult to realize small size and light weight of the first lens unit G1. Below the lower limit of the conditional expression (5), the refractive power of the third lens unit G3 is increased, and the interval between the second lens unit G2 and the third lens unit G3 in the zoom intermediate range becomes short. Thus, spherical aberration, coma aberration, and the like in the zoom intermediate range increase, and hence it becomes difficult to obtain good optical performance.

As described above, small size and light weight are achieved while a wide field angle and a high zoom ratio are maintained. Further, it is preferred to set the numerical value range of the conditional expressions (2) to (5) as follows.

$$2.4 < |f3/f23| < 30.0 \tag{2a}$$

$$4.0 < |f1/f23| < 7.5 \tag{3a}$$

$$3.4 < |f3/f2| < 31.0 \tag{4a}$$

$$5.5 < |f3/L2max| < 410.0 \tag{5a}$$

Further, it is preferred to satisfy the numerical value range of the conditional expressions (2b) to (5b) as follows.

$$3.0 < |f3/f23| < 7.0 \tag{2b}$$

$$4.1 < |f1/f23| < 6.1 \tag{3b}$$

$$3.5 < |f3/f2| < 6.1 \tag{4b}$$

$$16.0 < |f3/L2max| < 30.0 \tag{5b}$$

Next, the lens structure of each lens unit of each embodiment is described. Hereinafter, the lenses are arranged in order from the object side to the image side. The first lens unit G1 is constituted of a negative lens, a cemented lens of a negative lens and a positive lens, and three positive lenses. The second lens unit G2 is constituted of a negative lens, and a cemented lens of a positive lens and a negative lens, or is constituted of two negative lenses. The third lens unit G3 is constituted of one positive lens, or is constituted of a positive lens and a negative lens. The fourth lens unit G4 is constituted of a cemented lens of a negative lens and a positive lens. The fifth lens unit G5 is constituted of ten to twelve lenses as a whole.

As described above, according to each embodiment, the refractive powers of the second lens unit G2 and the third lens unit G3, the interval between the second lens unit G2 and the third lens unit G3 in the zooming operation, and the moving locus in the zooming operation are set appropriately. Thus, it is possible to obtain the zoom lens that has good optical performance, a wide field angle, a high zoom ratio, and small size and light weight of the entire system.

FIG. 16 is a schematic diagram of a main part of an image pickup apparatus (television camera system) in which the zoom lens of each embodiment is used as an image taking optical system. In FIG. 16, the image pickup apparatus includes a zoom lens 101 according to any one of Embodiments 1 to 7. The zoom lens 101 is detachable from a camera 124. The image pickup apparatus 125 is constituted by attaching the zoom lens 101 to the camera 124. The zoom lens 101 includes a first lens unit F, a magnification unit LZ, and a fifth lens unit G5 for imaging. The first lens unit F includes a focusing lens unit. The magnification unit LZ includes a second lens unit and a third lens unit that move on the optical axis for magnification, and a fourth lens unit that moves on the optical axis for compensating for the image plane variation due to magnification.

The image pickup apparatus 125 includes an aperture stop SP. In addition, at the same time, the fifth lens unit G5 includes a lens unit (magnification optical system) IE that can be removable from the optical path. The lens unit IE changes a focal length range of the entire system of the zoom lens 101. Drive mechanisms 114 and 115 constituted of a helicoid cam, a cam, or the like drive the first lens unit F and the magnification unit LZ, respectively, in the optical axis direction. Drive units 116 to 118 constituted of a motor or the like drive the drive mechanisms 114 and 115 and the aperture stop SP electrically. Detectors 119 to 121 constituted of an encoder, a potentiometer, a photosensor, or the like detect positions of the first lens unit F and the magnification unit LZ on the optical axis, and an aperture stop diameter of the aperture stop SP. In the camera 124, a glass block 109 corresponds to the optical filter or the color separation prism in the camera 124, and a solid-state image pickup element (photoelectric conversion element) 110 such as a charge coupled device (CCD) sensor or a complementary metal oxide semiconductor (CMOS) sensor receives a light image of a subject formed by the zoom lens 101. In addition, CPUs 111 and 122 control various drives of the camera 124 and the zoom lens main body 101. By applying the zoom lens of the present invention to the television camera in this way, the image pickup apparatus having high optical performance can be realized.

Hereinafter, Numerical Embodiments 1 to 7 corresponding to Embodiments 1 to 7 of the present invention are shown. In each numerical embodiment, surface numbers indicates orders of surfaces from the object side, r denotes a curvature radius of the i-th surface from the object side, d denotes an interval between the i-th surface and the (i+1)th surface from the object side, and nd and νd denote a refractive index and an Abbe number of an optical member having the i-th surface, respectively. Symbol * indicates an aspheric surface. The last three surfaces correspond to a glass block such as a filter. When an X axis corresponds to the optical axis direction, an H axis corresponds to the direction perpendicular to the optical axis, the propagation direction of light is positive, R denotes a paraxial curvature radius, k denotes a conical constant, and A4, A6, A8, and A10 denote aspheric coefficients, the aspherical shape is expressed by the following expression.

$$X = \frac{H^2/R}{1 + \sqrt{1 - (1+k)(H/R)^2}} +$$

$$A4H^4 + A6H^6 + A8H^8 + A10H^{10}$$

(Equation 1)

In addition, for example, "e-Z" means "$\times 10^{-Z}$". Symbol * indicates an aspheric surface. Correspondence between each embodiment and the conditional expression described above are shown in Table 1.

| Surface Number | r | d | nd | νd | Effective diameter |
|---|---|---|---|---|---|
| (Numerical Embodiment 1) | | | | | |
| 1 | −329.245 | 2.30 | 1.80100 | 35.0 | 78.08 |
| 2 | 249.707 | 3.92 | | | 76.45 |
| 3 | 3632.462 | 2.30 | 1.72825 | 28.5 | 76.36 |
| 4 | 115.991 | 13.27 | 1.43875 | 95.0 | 75.90 |
| 5 | −164.753 | 0.40 | | | 76.08 |
| 6 | 148.803 | 8.86 | 1.45600 | 90.3 | 75.12 |
| 7 | −267.585 | 6.25 | | | 74.80 |
| 8 | 133.728 | 6.62 | 1.72916 | 54.7 | 71.22 |
| 9 | −1936.997 | 0.15 | | | 70.47 |
| 10 | 65.273 | 6.33 | 1.77250 | 49.6 | 65.35 |
| 11 | 146.815 | (Variable) | | | 64.51 |
| 12* | 60.869 | 1.00 | 1.88300 | 40.8 | 25.54 |
| 13 | 13.783 | 6.68 | | | 20.29 |
| 14 | −30.565 | 5.80 | 1.80809 | 22.8 | 19.88 |
| 15 | −12.793 | 0.75 | 1.88300 | 40.8 | 19.78 |
| 16 | 182.256 | (Variable) | | | 20.09 |
| 17 | 49.356 | 2.41 | 1.69895 | 30.1 | 20.32 |
| 18 | −232.727 | (Variable) | | | 20.25 |
| 19 | −28.800 | 0.75 | 1.74320 | 49.3 | 19.93 |
| 20 | 40.674 | 2.56 | 1.84666 | 23.8 | 21.73 |
| 21 | −5282.872 | (Variable) | | | 22.13 |
| 22 (Stop) | ∞ | 1.30 | | | 26.58 |
| 23 | 194.399 | 4.82 | 1.65844 | 50.9 | 27.91 |
| 24 | −40.272 | 0.15 | | | 28.53 |
| 25 | 155.039 | 2.44 | 1.53172 | 48.8 | 28.92 |
| 26 | −456.105 | 0.15 | | | 28.93 |
| 27 | 54.034 | 6.94 | 1.48749 | 70.2 | 28.87 |
| 28 | −36.258 | 1.00 | 1.88300 | 40.8 | 28.47 |
| 29 | −436.176 | 36.60 | | | 28.58 |
| 30 | 43.800 | 5.93 | 1.48749 | 70.2 | 28.55 |
| 31 | −57.570 | 0.91 | | | 28.15 |
| 32 | −179.847 | 1.00 | 1.83481 | 42.7 | 27.23 |
| 33 | 23.887 | 7.39 | 1.51633 | 64.1 | 26.43 |
| 34 | −91.878 | 0.15 | | | 26.67 |
| 35 | 51.827 | 7.32 | 1.49700 | 81.5 | 26.68 |
| 36 | −29.619 | 1.00 | 1.88300 | 40.8 | 26.24 |
| 37 | 169.947 | 0.34 | | | 26.56 |
| 38 | 45.844 | 5.30 | 1.57501 | 41.5 | 27.06 |
| 39 | −60.117 | 4.50 | | | 26.96 |
| 40 | ∞ | 33.00 | 1.60859 | 46.4 | 40.00 |
| 41 | ∞ | 13.20 | 1.51633 | 64.1 | 40.00 |
| 42 | ∞ | (Variable) | | | 40.00 |
| Image plane | ∞ | | | | |

(Numerical Embodiment 1)

Aspherical surface data

Twelfth surface

K = 5.55425e−001 A 4 = 4.31568e−006 A 6 = −2.03508e−008
A 8 = 8.73188e−011 A10 = −2.80126e−013

Various data

| | | | | | |
|---|---|---|---|---|---|
| Zoom ratio | 21.00 | | | | |
| Focal length | 7.90 | 16.91 | 36.20 | 77.50 | 165.90 |
| F number | 1.90 | 1.90 | 1.90 | 1.90 | 2.68 |
| Field angle | 34.85 | 18.02 | 8.64 | 4.06 | 1.90 |
| Image height | 5.50 | 5.50 | 5.50 | 5.50 | 5.50 |
| Total lens length | 275.88 | 275.88 | 275.88 | 275.88 | 275.88 |
| BF | 7.90 | 7.90 | 7.90 | 7.90 | 7.90 |
| d11 | 0.70 | 23.56 | 38.95 | 48.51 | 53.88 |
| d16 | 0.35 | 2.26 | 1.67 | 2.01 | 1.68 |
| d18 | 57.13 | 29.57 | 12.42 | 4.26 | 7.22 |
| d21 | 6.00 | 8.79 | 11.14 | 9.41 | 1.40 |
| d42 | 7.90 | 7.90 | 7.90 | 7.90 | 7.90 |
| Entrance pupil position | 47.98 | 101.04 | 196.34 | 360.94 | 631.18 |
| Exit pupil position | 425.47 | 425.47 | 425.47 | 425.47 | 425.47 |
| Front principal point position | 56.03 | 118.64 | 235.68 | 452.82 | 862.99 |
| Rear principal point position | −0.00 | −9.01 | −28.30 | −69.60 | −158.00 |

Zoom lens unit data

| Unit | First surface | Focal length | Lens structure length | Front principal point position | Rear principal point position |
|---|---|---|---|---|---|
| 1 | 1 | 69.86 | 50.40 | 32.63 | 1.64 |
| 2 | 12 | −9.85 | 14.23 | 3.49 | −6.20 |
| 3 | 17 | 58.01 | 2.41 | 0.25 | −1.17 |
| 4 | 19 | −43.35 | 3.31 | −0.06 | −1.87 |
| 5 | 22 | 57.98 | 133.44 | 64.77 | −127.58 |

(Numerical Embodiment 2)

| Surface Number | r | d | nd | vd | Effective diameter |
|---|---|---|---|---|---|
| 1 | −164.056 | 2.20 | 1.80100 | 35.0 | 68.71 |
| 2 | 131.705 | 4.04 | | | 65.06 |
| 3 | 189.822 | 2.20 | 1.84666 | 23.8 | 65.50 |
| 4 | 90.749 | 11.33 | 1.43875 | 95.0 | 65.16 |
| 5 | −202.860 | 0.50 | | | 65.56 |
| 6 | 155.890 | 9.78 | 1.43387 | 95.1 | 66.25 |
| 7 | −123.905 | 5.11 | | | 66.18 |
| 8 | 101.141 | 9.94 | 1.72916 | 54.7 | 66.20 |
| 9 | −342.096 | 0.15 | | | 65.56 |
| 10 | 56.047 | 5.55 | 1.78800 | 47.4 | 59.79 |
| 11 | 103.504 | (Variable) | | | 58.79 |
| 12* | 231.760 | 1.00 | 1.83481 | 42.7 | 24.25 |
| 13 | 13.826 | 5.12 | | | 19.27 |
| 14 | −59.648 | 5.03 | 1.80809 | 22.8 | 18.99 |
| 15 | −13.341 | 0.75 | 1.83481 | 42.7 | 18.64 |
| 16 | 36.812 | (Variable) | | | 17.81 |
| 17 | 24.201 | 5.76 | 1.60342 | 38.0 | 18.00 |
| 18 | −21.031 | 1.00 | | | 17.56 |
| 19 | −17.399 | 0.75 | 1.83481 | 42.7 | 16.62 |
| 20 | −52.047 | (Variable) | | | 16.68 |
| 21 | −24.514 | 0.75 | 1.75500 | 52.3 | 18.00 |
| 22 | 45.059 | 2.75 | 1.84666 | 23.8 | 19.71 |
| 23 | −378.512 | (Variable) | | | 20.36 |
| 24 (Stop) | ∞ | 1.34 | | | 24.80 |
| 25 | 846.116 | 4.51 | 1.67003 | 47.2 | 25.93 |
| 26 | −32.916 | 0.20 | | | 26.62 |
| 27 | 51.557 | 3.71 | 1.48749 | 70.2 | 27.31 |
| 28 | −664.151 | 0.15 | | | 27.16 |
| 29 | 90.425 | 5.79 | 1.50127 | 56.5 | 26.97 |
| 30 | −32.267 | 1.20 | 1.88300 | 40.8 | 26.59 |
| 31 | −471.830 | 33.00 | | | 26.70 |
| 32 | 64.432 | 5.22 | 1.49700 | 81.5 | 26.92 |
| 33 | −43.149 | 0.50 | | | 26.69 |
| 34 | −138.707 | 1.40 | 1.83400 | 37.2 | 25.53 |
| 35 | 27.240 | 5.20 | 1.48749 | 70.2 | 24.48 |
| 36 | −366.027 | 2.12 | | | 24.45 |
| 37 | 50.056 | 7.49 | 1.50127 | 56.5 | 25.12 |
| 38 | −25.415 | 1.40 | 1.88300 | 40.8 | 24.95 |
| 39 | −120.075 | 1.32 | | | 25.66 |
| 40 | 48.467 | 4.97 | 1.51742 | 52.4 | 26.20 |
| 41 | −69.886 | 4.00 | | | 26.01 |
| 42 | ∞ | 33.00 | 1.60859 | 46.4 | 40.00 |
| 43 | ∞ | 13.20 | 1.51633 | 64.2 | 40.00 |
| 44 | ∞ | (Variable) | | | 40.00 |
| Image plane | ∞ | | | | |

Aspherical surface data

Twelfth surface

K = 2.53619e+002 A 4 = 1.18483e−005 A 6 = −1.37600e−008
A 8 = −3.90531e−011 A10 = −1.97015e−013

Various data

| | | | | | |
|---|---|---|---|---|---|
| Zoom ratio | 17.00 | | | | |
| Focal length | 8.00 | 16.24 | 32.98 | 56.07 | 136.00 |
| F number | 1.90 | 1.90 | 1.90 | 1.90 | 2.50 |
| Field angle | 34.51 | 18.71 | 9.47 | 5.60 | 2.32 |
| Image height | 5.50 | 5.50 | 5.50 | 5.50 | 5.50 |
| Total lens length | 262.18 | 262.18 | 262.18 | 262.18 | 262.18 |
| BF | 7.95 | 7.95 | 7.95 | 7.95 | 7.95 |
| d11 | 1.50 | 19.17 | 31.33 | 37.41 | 43.48 |
| d16 | 0.66 | 1.44 | 0.65 | 0.66 | 0.66 |
| d20 | 43.09 | 22.36 | 9.22 | 3.93 | 5.56 |
| d23 | 5.55 | 7.82 | 9.61 | 8.80 | 1.10 |
| d44 | 7.95 | 7.95 | 7.95 | 7.95 | 7.95 |
| Entrance pupil position | 44.23 | 83.88 | 152.58 | 231.45 | 442.88 |
| Exit pupil position | 249.00 | 249.00 | 249.00 | 249.00 | 249.00 |
| Front principal point position | 52.50 | 101.21 | 190.08 | 300.56 | 655.62 |
| Rear principal point position | −0.05 | −8.29 | −25.03 | −48.12 | −128.05 |

Zoom lens unit data

| Unit | First surface | Focal length | Lens structure length | Front principal point position | Rear principal point position |
|---|---|---|---|---|---|
| 1 | 1 | 55.94 | 50.80 | 32.03 | 3.94 |
| 2 | 12 | −8.92 | 11.90 | 3.05 | −4.71 |
| 3 | 17 | 42.16 | 7.51 | −1.40 | −6.13 |
| 4 | 21 | −37.90 | 3.50 | −0.20 | −2.12 |
| 5 | 24 | 61.74 | 129.72 | 73.37 | −140.29 |

(Numerical Embodiment 3)

| Surface Number | r | d | nd | vd | Effective diameter |
|---|---|---|---|---|---|
| 1 | −200.841 | 2.20 | 1.80100 | 35.0 | 70.99 |
| 2 | 118.901 | 7.85 | | | 67.59 |
| 3 | 188.249 | 2.20 | 1.84666 | 23.8 | 67.33 |
| 4 | 90.080 | 11.71 | 1.43875 | 95.0 | 66.46 |
| 5 | −211.855 | 0.50 | | | 66.58 |

(Numerical Embodiment 3)

| | | | | | |
|---|---|---|---|---|---|
| 6 | 142.502 | 10.56 | 1.43387 | 95.1 | 66.45 |
| 7 | −128.054 | 5.05 | | | 66.92 |
| 8 | 98.522 | 8.55 | 1.72916 | 54.7 | 68.07 |
| 9 | −434.439 | 0.15 | | | 67.77 |
| 10 | 58.974 | 5.03 | 1.78800 | 47.4 | 61.67 |
| 11 | 103.504 | (Variable) | | | 60.89 |
| 12* | 235.195 | 1.00 | 1.83481 | 42.7 | 26.16 |
| 13 | 14.331 | 6.59 | | | 20.75 |
| 14 | −378.780 | 7.17 | 1.80809 | 22.8 | 19.74 |
| 15 | −13.499 | 0.75 | 1.81600 | 46.6 | 18.89 |
| 16 | 73.458 | (Variable) | | | 17.66 |
| 17 | 23.684 | 3.48 | 1.51742 | 52.4 | 17.35 |
| 18 | −109.817 | 1.00 | | | 16.71 |
| 19 | −29.663 | 0.75 | 1.83400 | 37.2 | 16.61 |
| 20 | −354.593 | (Variable) | | | 16.43 |
| 21 | −24.442 | 0.75 | 1.75500 | 52.3 | 17.91 |
| 22 | 46.123 | 2.66 | 1.84666 | 23.8 | 19.61 |
| 23 | −357.005 | (Variable) | | | 20.24 |
| 24 (Stop) | ∞ | 1.34 | | | 24.74 |
| 25 | 846.116 | 4.51 | 1.67003 | 47.2 | 25.87 |
| 26 | −32.916 | 0.20 | | | 26.57 |
| 27 | 51.557 | 3.71 | 1.48749 | 70.2 | 27.29 |
| 28 | −664.151 | 0.15 | | | 27.14 |
| 29 | 90.425 | 5.79 | 1.50127 | 56.5 | 26.96 |
| 30 | −32.267 | 1.20 | 1.88300 | 40.8 | 26.58 |
| 31 | −471.830 | 33.00 | | | 26.71 |
| 32 | 64.432 | 5.22 | 1.49700 | 81.5 | 27.10 |
| 33 | −43.149 | 0.50 | | | 26.88 |
| 34 | −138.707 | 1.40 | 1.83400 | 37.2 | 25.71 |
| 35 | 27.240 | 5.20 | 1.48749 | 70.2 | 24.65 |
| 36 | −366.027 | 2.12 | | | 24.59 |
| 37 | 50.056 | 7.49 | 1.50127 | 56.5 | 24.90 |
| 38 | −25.415 | 1.40 | 1.88300 | 40.8 | 24.74 |
| 39 | −120.075 | 1.32 | | | 25.45 |
| 40 | 48.467 | 4.97 | 1.51742 | 52.4 | 26.01 |
| 41 | −69.886 | 4.00 | | | 25.82 |
| 42 | ∞ | 33.00 | 1.60859 | 46.4 | 40.00 |
| 43 | ∞ | 13.20 | 1.51633 | 64.2 | 40.00 |
| 44 | ∞ | (Variable) | | | 40.00 |
| Image plane | ∞ | | | | |

Aspherical surface data

Twelfth surface $K = 2.13810e+002 \ A4 = 1.16046e-005 \ A6 = -1.85889e-008$
$A8 = -3.00851e-011 \ A10 = -4.90371e-014$

Various data

| | | | | | |
|---|---|---|---|---|---|
| Zoom ratio | 17.00 | | | | |
| Focal length | 8.00 | 16.24 | 32.98 | 56.07 | 136.00 |
| F number | 1.90 | 1.90 | 1.90 | 1.90 | 2.50 |
| Field angle | 34.51 | 18.71 | 9.47 | 5.60 | 2.32 |
| Image height | 5.50 | 5.50 | 5.50 | 5.50 | 5.50 |
| Total lens length | 266.44 | 266.44 | 266.44 | 266.44 | 266.44 |
| BF | 8.49 | 8.49 | 8.49 | 8.49 | 8.49 |
| d11 | 1.50 | 19.61 | 31.74 | 38.03 | 44.43 |
| d16 | 0.15 | 1.00 | 0.13 | 0.16 | 0.15 |
| d20 | 43.08 | 21.37 | 8.36 | 2.71 | 4.34 |
| d23 | 5.55 | 8.31 | 10.05 | 9.39 | 1.35 |
| d44 | 8.49 | 8.49 | 8.49 | 8.49 | 8.49 |
| Entrance pupil position | 46.21 | 84.81 | 147.82 | 219.59 | 409.55 |
| Exit pupil position | 249.00 | 249.00 | 249.00 | 249.00 | 249.00 |
| Front principal point position | 54.48 | 102.15 | 185.32 | 288.73 | 622.46 |
| Rear principal point position | 0.49 | −7.75 | −24.49 | −47.57 | −127.51 |

Zoom lens unit data

| Unit | First surface | Focal length | Lens structure length | Front principal point position | Rear principal point position |
|---|---|---|---|---|---|
| 1 | 1 | 55.94 | 53.80 | 35.61 | 6.25 |
| 2 | 12 | −13.11 | 15.51 | 2.41 | −8.03 |
| 3 | 17 | 399.99 | 5.23 | −29.24 | −30.71 |
| 4 | 21 | −37.90 | 3.41 | −0.20 | −2.07 |
| 5 | 24 | 61.74 | 129.72 | 73.37 | −140.29 |

(Numerical Embodiment 4)

| Surface Number | r | d | nd | vd | Effective diameter |
|---|---|---|---|---|---|
| 1 | −171.037 | 2.20 | 1.80100 | 35.0 | 68.47 |
| 2 | 115.786 | 6.56 | | | 64.64 |
| 3 | 146.333 | 2.20 | 1.84666 | 23.8 | 64.25 |
| 4 | 84.999 | 12.66 | 1.43875 | 95.0 | 63.62 |
| 5 | −144.333 | 0.50 | | | 64.24 |
| 6 | 140.685 | 8.80 | 1.43387 | 95.1 | 68.29 |
| 7 | −209.278 | 5.06 | | | 68.59 |
| 8 | 109.169 | 9.16 | 1.72916 | 54.7 | 69.96 |
| 9 | −285.207 | 0.15 | | | 69.67 |
| 10 | 57.976 | 5.42 | 1.78800 | 47.4 | 62.74 |
| 11 | 103.504 | (Variable) | | | 61.91 |
| 12* | 206.067 | 1.00 | 1.83481 | 42.7 | 24.69 |
| 13 | 13.384 | 7.52 | | | 19.52 |
| 14 | −38.062 | 5.21 | 1.80809 | 22.8 | 18.42 |
| 15 | −11.618 | 0.75 | 1.81600 | 46.6 | 18.36 |
| 16 | −104.121 | (Variable) | | | 18.20 |
| 17 | 27.521 | 3.86 | 1.51742 | 52.4 | 17.79 |
| 18 | −42.365 | 1.00 | | | 17.25 |
| 19 | −29.744 | 0.75 | 1.83400 | 37.2 | 16.66 |
| 20 | 374.112 | (Variable) | | | 16.38 |
| 21 | −23.271 | 0.75 | 1.75500 | 52.3 | 18.22 |
| 22 | 51.113 | 2.56 | 1.84666 | 23.8 | 20.05 |
| 23 | −210.359 | (Variable) | | | 20.65 |
| 24 (Stop) | ∞ | 1.34 | | | 25.34 |
| 25 | 437.682 | 4.65 | 1.67003 | 47.2 | 26.56 |
| 26 | −33.673 | 0.20 | | | 27.23 |
| 27 | 58.064 | 3.33 | 1.48749 | 70.2 | 27.85 |
| 28 | −696.382 | 0.15 | | | 27.73 |
| 29 | 90.654 | 6.03 | 1.50127 | 56.5 | 27.55 |
| 30 | −31.860 | 1.20 | 1.88300 | 40.8 | 27.19 |
| 31 | −277.918 | 33.00 | | | 27.36 |
| 32 | 59.017 | 5.34 | 1.49700 | 81.5 | 27.28 |
| 33 | −45.129 | 0.49 | | | 27.01 |
| 34 | −124.139 | 1.40 | 1.83400 | 37.2 | 25.89 |
| 35 | 27.752 | 5.43 | 1.48749 | 70.2 | 24.82 |
| 36 | −149.661 | 2.12 | | | 24.76 |
| 37 | 49.151 | 6.93 | 1.50127 | 56.5 | 25.17 |
| 38 | −27.532 | 1.40 | 1.88300 | 40.8 | 24.94 |
| 39 | −182.549 | 1.32 | | | 25.44 |
| 40 | 50.414 | 4.77 | 1.51742 | 52.4 | 25.84 |
| 41 | −75.360 | 4.00 | | | 25.63 |
| 42 | ∞ | 33.00 | 1.60859 | 46.4 | 40.00 |
| 43 | ∞ | 13.20 | 1.51633 | 64.2 | 40.00 |
| 44 | ∞ | (Variable) | | | 40.00 |
| Image plane | ∞ | | | | |

Aspherical surface data

Twelfth surface $K = 1.27576e+002 \ A4 = 1.65807e-005 \ A6 = -2.90796e-008$
$A8 = -5.73587e-012 \ A10 = -7.47723e-014$

(Numerical Embodiment 4)

Various data

| | | | | | |
|---|---|---|---|---|---|
| Zoom ratio | 17.00 | | | | |
| Focal length | 8.00 | 16.24 | 32.98 | 56.07 | 136.00 |
| F number | 1.90 | 1.90 | 1.90 | 1.90 | 2.43 |
| Field angle | 34.51 | 18.71 | 9.47 | 5.60 | 2.32 |
| Image height | 5.50 | 5.50 | 5.50 | 5.50 | 5.50 |
| Total lens length | 263.54 | 263.54 | 263.54 | 263.54 | 263.54 |
| BF | 7.83 | 7.83 | 7.83 | 7.83 | 7.83 |
| d11 | 1.50 | 19.32 | 31.73 | 37.98 | 44.27 |
| d16 | 0.15 | 7.55 | 0.71 | 0.13 | 0.15 |
| d20 | 43.08 | 15.27 | 8.01 | 3.02 | 4.43 |
| d23 | 5.55 | 8.14 | 9.84 | 9.16 | 1.44 |
| d44 | 7.83 | 7.83 | 7.83 | 7.83 | 7.83 |
| Entrance pupil position | 45.02 | 82.91 | 149.10 | 224.43 | 425.40 |
| Exit pupil position | 321.05 | 321.05 | 321.05 | 321.05 | 321.05 |
| Front principal point position | 53.22 | 99.99 | 185.55 | 290.54 | 620.45 |
| Rear principal point position | −0.17 | −8.41 | −25.15 | −48.24 | −128.17 |

Zoom lens unit data

| Unit | First surface | Focal length | Lens structure length | Front principal point position | Rear principal point position |
|---|---|---|---|---|---|
| 1 | 1 | 55.94 | 52.70 | 34.12 | 5.24 |
| 2 | 12 | −13.11 | 14.48 | 1.57 | −9.59 |
| 3 | 17 | 399.99 | 5.61 | −30.66 | −32.14 |
| 4 | 21 | −37.90 | 3.31 | −0.31 | −2.13 |
| 5 | 24 | 58.32 | 129.32 | 66.91 | −133.50 |

(Numerical Embodiment 5)

| Surface Number | r | d | nd | vd | Effective diameter |
|---|---|---|---|---|---|
| 1 | −194.185 | 2.20 | 1.80100 | 35.0 | 71.95 |
| 2 | 152.990 | 6.44 | | | 68.29 |
| 3 | 172.100 | 2.20 | 1.84666 | 23.8 | 68.47 |
| 4 | 84.231 | 13.48 | 1.43875 | 95.0 | 67.63 |
| 5 | −159.684 | 0.50 | | | 67.86 |
| 6 | 145.720 | 8.90 | 1.43387 | 95.1 | 67.54 |
| 7 | −217.779 | 5.05 | | | 67.18 |
| 8 | 94.458 | 8.43 | 1.72916 | 54.7 | 65.37 |
| 9 | −518.506 | 0.15 | | | 64.94 |
| 10 | 57.871 | 5.95 | 1.78800 | 47.4 | 59.39 |
| 11 | 103.504 | (Variable) | | | 57.81 |
| 12* | 150.334 | 1.00 | 1.81600 | 46.6 | 22.84 |
| 13 | 15.519 | 5.40 | | | 18.50 |
| 14 | −22.956 | 2.52 | 1.69895 | 30.1 | 17.80 |
| 15 | −16.846 | 0.75 | 1.88300 | 40.8 | 17.40 |
| 16 | 24.645 | (Variable) | | | 17.08 |
| 17 | 26.371 | 5.62 | 1.72825 | 28.5 | 17.79 |
| 18 | −16.500 | 1.00 | | | 17.79 |
| 19 | −13.978 | 0.75 | 1.81600 | 46.6 | 16.39 |
| 20 | −28.496 | (Variable) | | | 16.71 |
| 21 | −24.278 | 0.75 | 1.75500 | 52.3 | 18.11 |
| 22 | 45.791 | 2.72 | 1.84666 | 23.8 | 19.85 |
| 23 | −331.958 | (Variable) | | | 20.49 |
| 24 (Stop) | ∞ | 1.34 | | | 24.95 |
| 25 | 222.103 | 3.87 | 1.67003 | 47.2 | 26.30 |
| 26 | −48.105 | 0.20 | | | 26.91 |
| 27 | 80.874 | 4.39 | 1.48749 | 70.2 | 27.80 |
| 28 | −57.980 | 0.15 | | | 27.89 |
| 29 | 106.732 | 5.75 | 1.50127 | 56.5 | 27.47 |
| 30 | −32.205 | 1.20 | 1.88300 | 40.8 | 27.12 |
| 31 | −231.564 | 33.00 | | | 27.28 |
| 32 | 45.733 | 5.36 | 1.49700 | 81.5 | 26.42 |
| 33 | −49.736 | 0.49 | | | 26.06 |
| 34 | −112.288 | 1.40 | 1.88300 | 40.8 | 25.08 |
| 35 | 21.225 | 6.64 | 1.50127 | 56.5 | 23.84 |
| 36 | −77.219 | 2.12 | | | 24.05 |
| 37 | 34.413 | 8.36 | 1.50127 | 56.5 | 25.23 |
| 38 | −22.777 | 1.40 | 1.88300 | 40.8 | 24.95 |
| 39 | 329.893 | 1.32 | | | 25.85 |
| 40 | 76.737 | 6.01 | 1.51742 | 52.4 | 26.73 |
| 41 | −29.118 | 4.00 | | | 26.93 |
| 42 | ∞ | 33.00 | 1.60859 | 46.4 | 40.00 |
| 43 | ∞ | 13.20 | 1.51633 | 64.2 | 40.00 |
| 44 | ∞ | (Variable) | | | 40.00 |
| Image plane | ∞ | | | | |

Aspherical surface data

Twelfth surface

K = 1.16812e+002 A 4 = 2.02208e−005 A 6 = −4.57379e−008
A 8 = 4.53466e−010 A10 = −1.15909e−012

Various data

| | | | | | |
|---|---|---|---|---|---|
| Zoom ratio | 17.00 | | | | |
| Focal length | 8.00 | 16.24 | 32.98 | 56.07 | 136.00 |
| F number | 1.90 | 1.90 | 1.90 | 1.90 | 2.50 |
| Field angle | 34.51 | 18.71 | 9.47 | 5.60 | 2.32 |
| Image height | 5.50 | 5.50 | 5.50 | 5.50 | 5.50 |
| Total lens length | 265.73 | 265.73 | 265.73 | 265.73 | 265.73 |
| BF | 7.37 | 7.37 | 7.37 | 7.37 | 7.37 |
| d11 | 1.50 | 19.15 | 31.10 | 37.06 | 42.95 |
| d16 | 1.20 | 1.42 | 1.20 | 1.20 | 1.20 |
| d20 | 43.08 | 22.96 | 9.70 | 4.59 | 6.18 |
| d23 | 5.55 | 7.80 | 9.34 | 8.48 | 1.00 |
| d44 | 7.37 | 7.37 | 7.37 | 7.37 | 7.37 |
| Entrance pupil position | 46.72 | 87.96 | 159.25 | 242.56 | 467.64 |
| Exit pupil position | 198.72 | 198.72 | 198.72 | 198.72 | 198.72 |
| Front principal point position | 55.06 | 105.58 | 197.91 | 315.06 | 700.31 |
| Rear principal point position | −0.63 | −8.87 | −25.61 | −48.70 | −128.63 |

Zoom lens unit data

| Unit | First surface | Focal length | Lens structure length | Front principal point position | Rear principal point position |
|---|---|---|---|---|---|
| 1 | 1 | 55.94 | 53.31 | 33.57 | 2.88 |
| 2 | 12 | −6.59 | 9.67 | 3.99 | −2.76 |
| 3 | 17 | 23.28 | 7.37 | 0.81 | −3.87 |
| 4 | 21 | −37.90 | 3.47 | −0.22 | −2.12 |
| 5 | 24 | 68.41 | 133.20 | 84.71 | −156.74 |

(Numerical Embodiment 6)

| Surface Number | r | d | nd | vd | Effective diameter |
|---|---|---|---|---|---|
| 1 | −384.654 | 2.20 | 1.80100 | 35.0 | 71.36 |
| 2 | 177.768 | 0.96 | | | 68.95 |
| 3 | 150.266 | 2.20 | 1.84666 | 23.8 | 69.02 |
| 4 | 68.887 | 12.73 | 1.43875 | 95.0 | 67.70 |
| 5 | −271.439 | 0.50 | | | 67.85 |
| 6 | 240.880 | 5.73 | 1.43387 | 95.1 | 68.02 |
| 7 | −355.573 | 5.20 | | | 67.92 |
| 8 | 80.669 | 9.44 | 1.72916 | 54.7 | 66.55 |
| 9 | −535.143 | 0.15 | | | 66.00 |
| 10 | 52.417 | 5.53 | 1.78800 | 47.4 | 57.30 |
| 11 | 103.504 | (Variable) | | | 56.35 |
| 12* | −363.524 | 1.00 | 1.81600 | 46.6 | 20.62 |

(Numerical Embodiment 6)

| | | | | | |
|---|---|---|---|---|---|
| 13 | 15.116 | 4.54 | 1.80100 | 35.0 | 16.47 |
| 14 | −19.231 | 2.07 | | | 15.96 |
| 15 | −15.608 | 0.75 | 1.88300 | 40.8 | 15.73 |
| 16 | 22.501 | (Variable) | | | 15.38 |
| 17 | 37.854 | 4.08 | 1.72825 | 28.5 | 16.76 |
| 18 | −19.985 | 1.00 | | | 16.89 |
| 19 | −15.202 | 0.75 | 1.81600 | 46.6 | 16.67 |
| 20 | −19.758 | (Variable) | | | 17.06 |
| 21 | −24.016 | 0.75 | 1.75500 | 52.3 | 18.33 |
| 22 | 42.769 | 2.73 | 1.84666 | 23.8 | 20.16 |
| 23 | −310.491 | (Variable) | | | 20.74 |
| 24 (Stop) | ∞ | 1.34 | | | 25.23 |
| 25 | 288.365 | 4.17 | 1.67003 | 47.2 | 26.50 |
| 26 | −40.337 | 0.20 | | | 27.11 |
| 27 | 54.495 | 4.95 | 1.48749 | 70.2 | 27.96 |
| 28 | −59.275 | 0.15 | | | 27.90 |
| 29 | −967.901 | 4.91 | 1.50127 | 56.5 | 27.36 |
| 30 | −30.408 | 1.20 | 1.88300 | 40.8 | 26.99 |
| 31 | −183.466 | 33.00 | | | 27.18 |
| 32 | 34.937 | 5.66 | 1.49700 | 81.5 | 25.77 |
| 33 | −52.877 | 0.67 | | | 25.29 |
| 34 | −84.784 | 1.40 | 1.88300 | 40.8 | 24.32 |
| 35 | 17.426 | 7.60 | 1.50127 | 56.5 | 22.85 |
| 36 | −56.188 | 2.12 | | | 23.19 |
| 37 | 36.394 | 8.21 | 1.50127 | 56.5 | 24.80 |
| 38 | −22.337 | 1.40 | 1.88300 | 40.8 | 24.70 |
| 39 | 309.097 | 1.32 | | | 25.95 |
| 40 | 121.731 | 6.74 | 1.51742 | 52.4 | 26.89 |
| 41 | −23.496 | 4.00 | | | 27.31 |
| 42 | ∞ | 33.00 | 1.60859 | 46.4 | 40.00 |
| 43 | ∞ | 13.20 | 1.51633 | 64.2 | 40.00 |
| 44 | ∞ | (Variable) | | | 40.00 |
| Image plane | ∞ | | | | |

Aspherical surface data

Twelfth surface

K = 5.32667e+002 A 4 = 5.10907e−005 A 6 = −5.82064e−008
A 8 = −1.88445e−010 A10 = 4.86527e−012

Various data

| | | | | | |
|---|---|---|---|---|---|
| Zoom ratio | 17.00 | | | | |
| Focal length | 8.00 | 16.24 | 32.98 | 56.07 | 136.00 |
| F number | 1.90 | 1.89 | 1.90 | 1.90 | 2.40 |
| Field angle | 34.51 | 18.71 | 9.47 | 5.60 | 2.32 |
| Image height | 5.50 | 5.50 | 5.50 | 5.50 | 5.50 |
| Total lens length | 258.17 | 258.17 | 258.17 | 258.17 | 258.17 |
| BF | 7.52 | 7.52 | 7.52 | 7.52 | 7.52 |
| d11 | 1.50 | 18.04 | 30.06 | 35.56 | 40.82 |
| d16 | 3.00 | 3.89 | 2.98 | 3.01 | 3.00 |
| d20 | 43.08 | 24.54 | 11.59 | 7.13 | 8.69 |
| d23 | 5.55 | 6.67 | 8.50 | 7.43 | 0.62 |
| d44 | 7.52 | 7.52 | 7.52 | 7.52 | 7.52 |
| Entrance pupil position | 43.21 | 86.57 | 172.26 | 272.11 | 548.90 |
| Exit pupil position | 155.36 | 155.36 | 155.36 | 155.36 | 155.36 |
| Front principal point position | 51.64 | 104.60 | 212.59 | 349.44 | 810.02 |
| Rear principal point position | −0.48 | −8.72 | −25.46 | −48.55 | −128.48 |

Zoom lens unit data

| Unit | First surface | Focal length | Lens structure length | Front principal point position | Rear principal point position |
|---|---|---|---|---|---|
| 1 | 1 | 55.94 | 44.62 | 26.09 | −1.41 |
| 2 | 12 | −5.78 | 8.35 | 3.27 | −2.48 |
| 3 | 17 | 23.17 | 5.83 | 1.49 | −2.38 |
| 4 | 21 | −37.90 | 3.48 | −0.23 | −2.14 |
| 5 | 24 | 80.16 | 135.23 | 105.01 | −183.39 |

(Numerical Embodiment 7)

| Surface Number | r | d | nd | vd | Effective diameter |
|---|---|---|---|---|---|
| 1 | 9481.631 | 3.00 | 1.83481 | 42.7 | 111.65 |
| 2 | 188.270 | 1.07 | | | 109.28 |
| 3 | 187.729 | 15.78 | 1.43387 | 95.1 | 109.40 |
| 4 | −299.935 | 11.15 | | | 109.12 |
| 5 | 196.757 | 8.21 | 1.43387 | 95.1 | 109.73 |
| 6 | 1586.014 | 0.20 | | | 109.56 |
| 7 | 158.068 | 10.26 | 1.43387 | 95.1 | 108.24 |
| 8 | 1148.110 | 0.20 | | | 107.61 |
| 9 | 129.383 | 9.29 | 1.43387 | 95.1 | 103.49 |
| 10 | 393.464 | (Variable) | | | 102.47 |
| 11 | 60.772 | 1.00 | 1.88300 | 40.8 | 32.97 |
| 12 | 25.525 | 8.35 | | | 29.38 |
| 13 | −41.393 | 0.90 | 1.81600 | 46.6 | 28.46 |
| 14 | 70.252 | (Variable) | | | 28.24 |
| 15 | 57.029 | 6.75 | 1.80809 | 22.8 | 28.76 |
| 16 | −54.943 | 1.50 | | | 28.47 |
| 17 | −47.597 | 1.10 | 1.81600 | 46.6 | 27.58 |
| 18 | 869.679 | (Variable) | | | 27.39 |
| 19 | −47.569 | 1.30 | 1.71700 | 47.9 | 28.16 |
| 20 | 56.877 | 5.89 | 1.84649 | 23.9 | 30.12 |
| 21 | 398.973 | (Variable) | | | 31.31 |
| 22 (Stop) | ∞ | 4.05 | | | 36.72 |
| 23 | 226.671 | 6.76 | 1.60738 | 56.8 | 39.80 |
| 24 | −52.362 | 0.15 | | | 40.36 |
| 25 | 3180.721 | 3.29 | 1.51823 | 58.9 | 40.32 |
| 26 | −125.098 | 0.35 | | | 40.30 |
| 27 | 39.069 | 9.43 | 1.48749 | 70.2 | 38.94 |
| 28 | −98.064 | 1.50 | 1.83400 | 37.2 | 37.77 |
| 29 | −2415.030 | 0.15 | | | 36.76 |
| 30 | 36.731 | 8.31 | 1.48749 | 70.2 | 34.11 |
| 31 | −86.274 | 1.50 | 1.88300 | 40.8 | 32.19 |
| 32 | 30.301 | 50.00 | | | 29.03 |
| 33 | −120.629 | 4.64 | 1.51742 | 52.4 | 31.20 |
| 34 | −35.365 | 2.54 | | | 31.44 |
| 35 | 63.076 | 1.20 | 1.78590 | 44.2 | 28.68 |
| 36 | 31.790 | 6.50 | 1.51742 | 52.4 | 27.60 |
| 37 | −109.650 | 2.01 | | | 26.82 |
| 38 | 76.161 | 5.44 | 1.51742 | 52.4 | 24.54 |
| 39 | −36.256 | 1.20 | 1.83481 | 42.7 | 23.64 |
| 40 | 48.072 | 0.67 | | | 22.86 |
| 41 | 33.725 | 4.04 | 1.48749 | 70.2 | 22.99 |
| 42 | −964.584 | 3.80 | | | 22.65 |
| 43 | ∞ | 34.37 | 1.60859 | 46.4 | 40.00 |
| 44 | ∞ | 13.75 | 1.51680 | 64.2 | 40.00 |
| 45 | ∞ | (Variable) | | | 40.00 |
| Image plane | ∞ | | | | |

Various data

| | | | | | |
|---|---|---|---|---|---|
| Zoom ratio | 35.00 | | | | |
| Focal length | 11.00 | 26.76 | 65.08 | 158.29 | 385.00 |
| F number | 2.10 | 2.09 | 2.10 | 2.09 | 3.60 |
| Field angle | 26.57 | 11.61 | 4.83 | 1.99 | 0.82 |
| Image height | 5.50 | 5.50 | 5.50 | 5.50 | 5.50 |
| Total lens length | 400.66 | 400.66 | 400.66 | 400.66 | 400.66 |
| BF | 9.01 | 9.01 | 9.01 | 9.01 | 9.01 |
| d10 | 2.69 | 56.90 | 91.27 | 111.52 | 122.44 |
| d14 | 1.56 | 3.54 | 1.80 | 1.52 | 1.56 |
| d18 | 126.82 | 64.70 | 26.05 | 6.84 | 12.38 |
| d21 | 8.97 | 14.90 | 20.91 | 20.15 | 3.65 |
| d45 | 9.01 | 9.01 | 9.01 | 9.01 | 9.01 |
| Entrance pupil position | 81.32 | 232.61 | 520.20 | 1038.66 | 1973.60 |
| Exit pupil position | 641.46 | 641.46 | 641.46 | 641.46 | 641.46 |
| Front principal point position | 92.51 | 260.50 | 591.98 | 1236.57 | 2592.97 |
| Rear principal point position | −1.99 | −17.75 | −56.08 | −149.29 | −375.99 |

-continued (Numerical Embodiment 7)

Zoom lens unit data

| Unit | First surface | Focal length | Lens structure length | Front principal point position | Rear principal point position |
|---|---|---|---|---|---|
| 1 | 1 | 161.84 | 59.17 | 34.19 | −8.92 |
| 2 | 11 | −17.66 | 10.25 | 5.47 | −3.17 |
| 3 | 15 | 83.62 | 9.35 | −3.23 | −8.66 |
| 4 | 19 | −66.60 | 7.19 | 0.44 | −3.46 |
| 5 | 22 | 89.02 | 165.66 | 99.66 | −192.38 |

TABLE 1

| Conditional expression No. | Conditional expression | Numerical Embodiment 1 | Numerical Embodiment 2 | Numerical Embodiment 3 | Numerical Embodiment 4 |
|---|---|---|---|---|---|
| (1) | L2MAX/L2W | 6.53 | 2.19 | 6.66 | 50.31 |
| (2) | |f3/f23| | 4.89 | 3.72 | 29.50 | 29.50 |
| (3) | |f1/f23| | 5.89 | 4.94 | 4.13 | 4.13 |
| (4) | |f3/f2| | 5.89 | 4.72 | 30.50 | 30.50 |
| (5) | f3/L2MAX | 25.62 | 29.20 | 400.17 | 53.00 |

| Conditional expression No. | Conditional expression | Numerical Embodiments | Numerical Embodiment 6 | Numerical Embodiment 7 |
|---|---|---|---|---|
| (1) | L2MAX/L2W | 1.18 | 1.30 | 2.27 |
| (2) | |f3/f23| | 2.53 | 3.01 | 3.74 |
| (3) | |f1/f23| | 6.08 | 7.26 | 7.23 |
| (4) | |f3/f2| | 3.53 | 4.01 | 4.74 |
| (5) | f3/L2MAX | 16.40 | 5.95 | 23.64 |

As described above, according to the present invention, it is possible to obtain the zoom lens having a wide field angle, a high zoom ratio, and high optical performance in the entire zoom range, and the image pickup apparatus including the zoom lens.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-231316, filed Oct. 5, 2009, which is hereby incorporated by reference herein in its entirety.

What is claimed is:

1. A zoom lens comprising, in order from an object side to an image side:
   a first lens unit having positive refractive power which does not move for zooming, and at least a part of which moves for focusing;
   a second lens unit adjacent to the first lens unit and having negative refractive power which moves for zooming;
   a third lens unit adjacent to the second lens unit and having positive refractive power which moves for zooming;
   a fourth lens unit having negative refractive power which moves for zooming; and
   a fifth lens unit having positive refractive power which does not move for zooming,
   wherein when fW denotes a focal length of the entire system of the zoom lens at a wide angle end, and Z denotes a zoom ratio, a focal length fM at an intermediate zoom position is expressed by the following equation:

$$fM = fW \times \sqrt{Z}, \text{ and}$$

wherein when L2W denotes an interval between the second lens unit and the third lens unit at the wide angle end, and L2 max denotes a maximum value of the interval between the second lens unit and the third lens unit in a zoom range from the wide angle end to the focal length fM, the following conditional expression is satisfied:

$$1.1 < L2\max/L2W < 55.0.$$

2. A zoom lens according to claim 1, wherein, when f2 and f3 denote focal lengths of the second lens unit and the third lens unit, respectively, and a combined focal length f23 of the second lens unit and the third lens unit is expressed by the following equation:

$$f23 = \frac{f2 \times f3}{f2 + f3} \qquad \text{(Equation 2)}$$

the following conditional expression is satisfied:

$$2.3 < |f3/f23| < 33.0.$$

3. A zoom lens according to claim 1, wherein, when f1, f2, and f3 denote focal lengths of the first lens unit, the second lens unit, and the third lens unit, respectively, and a combined focal length f23 of the second lens unit and the third lens unit is expressed by the following equation:

$$f23 = \frac{f2 \times f3}{f2 + f3} \qquad \text{(Equation 3)}$$

the following conditional expression is satisfied:

$$4.0 < |f1/f23| < 8.0.$$

4. A zoom lens according to claim 1, wherein, when f2 and f3 denote focal lengths of the second lens unit and the third lens unit, respectively, the following conditional expression is satisfied:

$$3.3 < |f3/f2| < 33.0.$$

5. A zoom lens according to claim 1, wherein, when f3 denotes a focal length of the third lens unit, the following conditional expression is satisfied:

$$5.0 < |f3/L2\max| < 420.0.$$

6. An image pickup apparatus, comprising:
the zoom lens according to claim 1; and
a solid-state image pickup element which receives a light image formed by the zoom lens.

* * * * *